US012468963B2

(12) United States Patent
Woo et al.

(10) Patent No.: US 12,468,963 B2
(45) Date of Patent: Nov. 11, 2025

(54) SERVER AND METHOD FOR PROVIDING USER-PARTICIPATING-TYPE AI TRAINING SERVICE USING THE ELECTRONIC DEVICE

(71) Applicant: Sunghee Woo, San Diego, CA (US)

(72) Inventors: Sunghee Woo, San Diego, CA (US); Dongjin Park, Chicago, IL (US)

(73) Assignee: Sunghee Woo, San Diego, CA (US)

( * ) Notice: Subject to any disclaimer, the term of this patent is extended or adjusted under 35 U.S.C. 154(b) by 0 days.

(21) Appl. No.: 18/061,802

(22) Filed: Dec. 5, 2022

(65) Prior Publication Data

US 2023/0096243 A1 Mar. 30, 2023

Related U.S. Application Data

(63) Continuation of application No. 16/818,878, filed on Mar. 13, 2020, now Pat. No. 11,544,594.

(Continued)

(30) Foreign Application Priority Data

Apr. 11, 2019 (KR) .......................... 10-2019-0042310

(51) Int. Cl.
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
CPC .......... G06N 20/00; G06N 3/08; G06N 3/006; G06N 3/0454; G06N 3/004; G06N 5/022;

(Continued)

(56) References Cited

U.S. PATENT DOCUMENTS 6,163,773 A * 12/2000 Kishi .................... G06F 12/121
711/134
8,644,990 B2 2/2014 Kim et al.
(Continued)

FOREIGN PATENT DOCUMENTS

JP 2018-008316 A 1/2018
KR 10-2009-0086805 A 8/2009
(Continued)

OTHER PUBLICATIONS

Office Action dated Aug. 25, 2020 in Korean Application No. 10-2019-0042310.
(Continued)

*Primary Examiner* — Scott L Jarrett

(57) ABSTRACT

An electronic device for providing a user-participating-type artificial intelligence (AI) training service is proposed. The electronic device may include a user input receiving unit configured to receive, from a user of the service, initial setting user inputs about an initial setting for AI training and to receive an AI training user input for requesting for the AI training. The device may further include a processor configured to provide, through a screen of the electronic device, an initial setting UI (User Interface) receiving the initial setting user inputs and an AI training UI receiving the AI training user input, and a communication unit configured to transmit, to a service providing server, data corresponding to the initial setting user inputs and the AI training user input and to receive, from the service providing server, initial setting data and/or AI training data generated based on the transmitted data.

259 Claims, 11 Drawing Sheets

Related U.S. Application Data

(60) Provisional application No. 62/868,984, filed on Jun. 30, 2019.

(58) Field of Classification Search
CPC .......... G06N 5/04; G06N 7/005; G06N 3/008; G06N 3/0427; G06N 3/0445; G06N 3/084; G06N 3/088; G06N 5/027; G06N 7/00
See application file for complete search history.

(56) References Cited

U.S. PATENT DOCUMENTS

| | | | |
|---|---|---|---|
| 8,996,429 | B1 | 3/2015 | Francis, Jr. et al. |
| 9,672,756 | B2* | 6/2017 | Gupta ............... G09B 19/0053 |
| 10,391,636 | B2 | 8/2019 | Breazeal |
| 10,452,992 | B2* | 10/2019 | Lee ....................... G06N 20/00 |
| 10,576,380 | B1 | 3/2020 | Beltran et al. |
| 10,732,789 | B1 | 8/2020 | Marcinelli et al. |
| 10,762,414 | B1 | 9/2020 | Marggraff et al. |
| 10,946,281 | B2 | 3/2021 | Fear et al. |
| 10,963,774 | B2 | 3/2021 | Osotio et al. |
| 11,103,800 | B1 | 8/2021 | Roberts et al. |
| 11,161,236 | B2 | 11/2021 | Mallinson |
| 11,182,695 | B1* | 11/2021 | Kirsche ................ G06N 3/088 |
| 11,227,187 | B1* | 1/2022 | Weinberger ............ G10L 15/19 |
| 11,253,783 | B2* | 2/2022 | Lin ....................... G06N 3/045 |
| 11,263,540 | B2* | 3/2022 | Kirchhoff ................ G06F 8/35 |
| 11,279,036 | B2 | 3/2022 | Thackston et al. |
| 11,281,975 | B1* | 3/2022 | Isaksson ............ G06F 11/3664 |
| 11,334,819 | B2* | 5/2022 | Feng ....................... G06N 20/00 |
| 11,494,686 | B1* | 11/2022 | Mandayam Comar ....................... G06N 20/00 |
| 11,500,376 | B2* | 11/2022 | Jung ....................... G07C 5/008 |
| 11,593,620 | B2* | 2/2023 | Ito ............................ G06N 3/084 |
| 11,593,700 | B1* | 2/2023 | Ansari ..................... G06N 5/01 |
| 11,636,124 | B1* | 4/2023 | Narayanaswamy ....................... G06F 18/2148 707/776 |
| 11,657,069 | B1* | 5/2023 | Narayanaswamy ... G06N 20/20 707/602 |
| 11,783,175 | B2* | 10/2023 | Leskovec .............. G06F 16/906 706/12 |
| 11,853,401 | B1* | 12/2023 | Nookula ................ G06N 20/00 |
| 2006/0224546 | A1 | 10/2006 | Ballin et al. |
| 2015/0290795 | A1 | 10/2015 | Oleynik |
| 2015/0379429 | A1* | 12/2015 | Lee ........................ G09B 5/00 706/11 |
| 2016/0042296 | A1* | 2/2016 | Shan ..................... G06N 5/022 706/11 |
| 2016/0379519 | A1* | 12/2016 | Gupta .................... A63H 30/04 434/118 |
| 2017/0243132 | A1* | 8/2017 | Sainani .................. H04L 41/20 |
| 2017/0291295 | A1 | 10/2017 | Gupta et al. |
| 2017/0300828 | A1* | 10/2017 | Feng ....................... H04L 67/10 |
| 2017/0323345 | A1 | 11/2017 | Flowers et al. |
| 2018/0189228 | A1* | 7/2018 | Park ..................... G06F 18/2148 |
| 2018/0283723 | A1* | 10/2018 | Ock ........................ G05B 15/02 |
| 2019/0138904 | A1 | 5/2019 | Millius et al. |
| 2019/0286943 | A1* | 9/2019 | Leskovec ............ G06F 16/9024 |
| 2019/0327330 | A1* | 10/2019 | Natarajan ............ G06V 10/764 |
| 2019/0340524 | A1 | 11/2019 | Kirchoff et al. |
| 2020/0012962 | A1* | 1/2020 | Dent ..................... G06F 9/5011 |
| 2020/0111021 | A1* | 4/2020 | Keyngnaert ........... G06N 20/20 |
| 2020/0125586 | A1 | 4/2020 | Rezaeian et al. |
| 2020/0134370 | A1* | 4/2020 | Chopra ................ G06N 20/00 |
| 2020/0143224 | A1* | 5/2020 | Wagle .................... G07B 15/02 |
| 2020/0238178 | A1* | 7/2020 | Lin ........................ A63F 13/35 |
| 2020/0327431 | A1 | 10/2020 | Woo |
| 2020/0364492 | A1* | 11/2020 | Meirov ................. G06F 18/214 |
| 2020/0380301 | A1* | 12/2020 | Siracusa ................ G06N 20/00 |
| 2021/0023711 | A1 | 1/2021 | Lee et al. |
| 2021/0162589 | A1* | 6/2021 | Tan ....................... B25J 9/1605 |
| 2022/0152512 | A1* | 5/2022 | Lin ........................ A63F 13/67 |

FOREIGN PATENT DOCUMENTS

| | | |
|---|---|---|
| KR | 10-1927050 B1 | 12/2018 |
| KR | 10-1940928 B1 | 1/2019 |

OTHER PUBLICATIONS

Final Office Action dated May 24, 2021 in Korean Application No. 10-2019-0042310.
Notice of Allowance dated Nov. 4, 2021 in Korean Application No. 10-2019-0042310.
Biggs et al., "A Survey of Robot Programming Systems", Proceedings of the Australian conference on robots and automation, vol. 1, 2003.
CHiP—User Manual, WowWee Inc, 2015.
Huang et al., "Code3: A system for End-to-End Programming of Mobile manipulator Robots for Novices and Experts", HRI '17, ACM, Mar. 6-9, 2017.
Marion et al., "Director: A User Interface Designed for Robot Operation with Shared Autonomy", Journal of Field Robotics, 2016.
Robotiq User Interface Instruction Manual, Robotiq Inc. 2014.
Spranger et al., "Human-Machine Interface for Remote Training of Robot Tasks", IEEE Instrumentation and Measurement Society, 2018.
Steinmetz et al., "RAZER—A HRI for Visual Task-Level Programming and Intuitive Skill Parameterization", IEEE Robotics and Automation Letters, vol. 3, No. 3, Jul. 2018.
Tekno—The Robotic Puppy Owner's Manual, Tekno, Apr. 2012.
Weintrop et al., "Evaluating CoBlox: A Comparative Study of Robotics Programming Environments for Adult Novices", CHI 2018, Apr. 21-26, 2018.
KNIME Documentation, Blog "How to Automate Machine Learning", available on the Internet on Apr. 8, 2019, posted on the Internet by Christian Birkhold, Paolo Tamagnini & Simon Schmid at https://www.knime.com/blog/how-to- automate-machine-learning, pp. 15.
KNIME Video Tutorial, "Random Forest Model for Kaggle Titanic (part 2)", available at timestamp 3:39, 3:56 & 4:38 on the Internet on Jul. 17, 2019, posted on the Internet by Eric at https://youtu.be/xGWYlafHyiw?feature=shared.
KNIME predictive analytics Documentation, section "Tree Ensembler Learner", available on Internet at https://www.knime.com/sites/default/files/inline-images/_labs_treeensemble_Tree_Ensemble_Learner.html, pp. 3.
KNIME Documentation, Blog "Stuck in the Nine Circles of Hell? Try Parameter Optimization & A Cup of Tea", available on the Internet on May 28, 2018, posted on the Internet by Daria Goldmann at https://www.knime.com/blog/stuck-in-the-nine-circles-of-hell-try-parameter-optimization-a-cup-of-tea, pp. 14.
RapidMiner Video Tutorial, "Training Predictive Models with RapidMiner", available at timestamp 0:14, 0:19 & 0.33/30:51 on the Internet on Dec. 19, 2018, posted by Abraham Otero at https://youtu.be/xXapcM5h52A? feature=shared.
Medium Blog "A Walk-through the Rapid Miner", available on the Internet on Oct. 16, 2018, posted on the Internet by Hariharan M at https://harimanikandan.medium.com/a-walk-through-the-rapid-miner-921dfaf53722# :~: text=Rapid% 20Miner%20is%20a%20Data, have% 20a%20load%20of%20data., pp. 49.
Orange Video Tutorial "Classification in Orange (CS2401)", available at timestamp 3:06, 5:14, 6:39-7:12, 7:44, 8:14, 11:44 & 15:20/24:01 on the Internet on Nov. 1, 2015, posted by haikel5 at https://youtu.be/G3W2Jc7Wtfw? feature=shared.
Medium Blog "Classifying Spam Messages with Create ML, CoreML3, and Skafos_ Part 1 _ by Tyler Hutcherson", available on the Internet on Sep. 21, 2019, posted on the Internet by Tyler Hutcherson at https://medium.com/@tyler. hutcherson/classifying-spam-messages-with-create-ml-coreml3-and-skafos-part-1-137e7f6cf037, pp. 14.
Apple WWDC19 Video, "Training Text Classifiers in Create ML", available at timestamp 4:11 & 4:15/12:04 on the Internet, posted by Apple at https://developer.apple.com/videos/play/wwdc2019/428/.
Medium Blog "Classifying Spam Messages with Create ML, CoreML3, and Skafos_ Part 1 _ by Tyler Hutcherson", available on the Internet on Sep. 21, 2019, posted on the Internet by Tyler Hutcherson at

(56) References Cited

OTHER PUBLICATIONS https://medium.com/@skyl/how-to-build-twitter-sentiment-analysis-using-skyl-ai-12c5ea184b1f, pp. 11.

\* cited by examiner

SERVER AND METHOD FOR PROVIDING USER-PARTICIPATING-TYPE AI TRAINING SERVICE USING THE ELECTRONIC DEVICE

CROSS-REFERENCE TO RELATED APPLICATION(S)

This application is a continuation application of U.S. patent application Ser. No. 16/818,878, filed Mar. 13, 2020 which claims priority under 35 U.S.C. 119 of U.S. Provisional Patent Application No. 62/868,984 filed on Jun. 30, 2019, and of Korean Patent Application No. 10-2019-0042310 filed on Apr. 11, 2019, in the Korean Intellectual Property Office, the entire disclosure of each are hereby incorporated by reference.

TECHNICAL FIELD

Various embodiments of the present disclosure relate to a service performing artificial intelligence (AI) training for a specific subject. In particular, the various embodiments of the present disclosure relate to an electronic device, a service providing server, and a system for performing the AI training through a user input. Without coding directly by a user of the service, the user can conveniently utilize the present disclosure.

BACKGROUND

After the third wave of Alvin Toffler, lots of experts predict and refer the fourth wave. One of strong candidates is an AI (Artificial Intelligence.) Actually, bio industries, 3D printers, robots, AI, and smartphones were chosen as candidates of the fourth wave at the Swiss Davos Forum on 20 Jan. 2016. There are some opinions that mankind will be relieved from labor thanks to development of robots and AI.

The AI is artificially embodied from at least of or all of human intelligence, the term "AI" was first mentioned by John McCarthy at a workshop held by Marvin Minsky, Claude Shannon, etc. who greatly contributed to the AI and information theory at Dartmouth in 1956. However, concept of the AI existed even earlier. For example, Alan Turing suggested the possibility of "thinking machine" and the Turing test in 1950, and the beginning neural network model was suggested in 1943.

In the middle of the 20th century, AI research was such an innovative study that received lots of attention and had been studied continuously. The AI can process neural language and solve complex mathematics problems by using computers, which originally thought to be an area of human. Of course, the AI industries were a huge field that built a market size of over thousand million dollars in 1980.

After 21st century, Geoffrey Hinton's thesis on deep learning was announced so that unsupervised learning became available that had been thought to be impossible. Furthermore, outputs surpassing a level of human was coming down the pike. The current AI in addition to AlphaGo has a higher recognition rate for human faces and objects. Thus, in the field of the AI, perception that the AI can surpass human ability at the high speed is spread.

SUMMARY

Various embodiments of the present disclosure are to address at least the above-mentioned problems and/or disadvantages and to provide at least the advantages described below.

The various embodiments of the present disclosure are devised to providing an electronic device, a service providing server, and a system providing a service of user-participating-type AI (Artificial Intelligence) training. According to various embodiments, without complex coding for AI training by a user who is even not an expert, the AI training is simply performed by receiving user inputs through a predetermined platform resulting in improving user-convenience.

According to an embodiment of the present disclosure, an electronic device for providing a user-participating-type AI (Artificial Intelligence) training service is provided. The electronic device may include a user input receiving unit configured to receive, from a user of the service, initial setting user inputs about an initial setting for AI training and to receive an AI training user input for requesting for the AI training; a processor configured to provide, through a screen of the electronic device, an initial setting UI (User Interface) receiving the initial setting user inputs and an AI training UI receiving the AI training user input; and a communication unit configured to transmit, to a service providing server, data corresponding to the initial setting user inputs and the AI training user input and to receive, from the service providing server, initial setting data and/or AI training data generated based on the transmitted data. The initial setting user inputs may include a user input selecting a subject for the AI training, a user input selecting an AI algorithm from AI algorithms, a user input determining a type of input data for the AI training, and a user input determining a plurality of behavior patterns of the subject.

According to various embodiments of the present disclosure, the communication unit may be further configured to receive, from the service providing server, information on an AI training algorithm generated as a result of the AI training, and the information on the AI training algorithm may be exclusive information for a user account of the user.

According to various embodiments of the present disclosure, the communication unit may be configured to receive, from the service providing server, the information on the AI training algorithm in response to a user input requesting for the information on the AI training algorithm, and the information on the AI training algorithm may be generated by the service providing server if the number of the AI training being executed exceeds a predetermined threshold.

According to various embodiments of the present disclosure, the information on the AI training algorithm may be transmitted to an external device and allows the external device to be operated based on the information on the AI training algorithm.

According to various embodiments of the present disclosure, the type of input data may include text information, voice information, and image information, and a data size of input data included in the AI training user input may be limited within a predetermined threshold.

According to various embodiments of the present disclosure, the user input receiving unit may be further configured to receive an invitation user input allowing another user to participate in the AI training, the communication unit may be further configured to transmit, to another electronic device of the another user, data corresponding to the invitation user input directly or through the service providing server, and the AI training may be further executed through the another electronic device.

According to various embodiments of the present disclosure, the information on the AI training algorithm may be corresponding to a result of the AI training executed through the electronic device and the another electronic device, and the information on the AI training algorithm may be exclusive information for user accounts of the user and the another user.

According to various embodiments of the present disclosure, the initial setting user inputs may further include determining parameter and structure provided based on the selected AI algorithm, and the parameter may include the number of layers for the AI algorithm, node for each of layers, function, and the number of iterations.

According to various embodiments of the present disclosure, the plurality of behavior patterns may include predetermined behavior patterns and/or an additional behavior pattern directly input by the user, and the predetermined behavior patterns may include an additional behavior pattern directly input by another user.

According to various embodiments of the present disclosure, the processor may be further configured to reduce a data size of input data input through the AI training UI by preprocessing the input data.

According to various embodiments of the present disclosure, information on the AI training algorithm generated as a result of the AI training may be shared with other users using the service.

According to an embodiment of the present disclosure, a service providing server for providing a user-participating-type AI (Artificial Intelligence) training service is provided. The service providing service providing server may include a communication unit configured to receive, from an electronic device of a user using the service, a request for an initial setting for AI training and a request for the AI training; and a processor configured to execute, based on the received request, the initial setting for the AI training and the AI training, and to transmit, to the electronic device, initial setting data and/or AI training data respectively corresponding to the executed initial setting and the executed AI training. The request for the initial setting may include a subject for the AI training, an AI algorithm from AI algorithms, a type of input data for the AI training, and a plurality of behavior patterns of the subject.

According to various embodiments of the present disclosure, the communication unit may be further configured to receive, from the electronic device, a request for information on an AI training algorithm, the processor may be further configured to generate the information on the AI training algorithm as a result of the AI training, and the information on the AI training algorithm may be exclusive information for a user account of the user.

According to various embodiments of the present disclosure, the processor may be configured to generate the information on the AI training algorithm if the number of the AI training being executed exceeds a predetermined threshold.

According to various embodiments of the present disclosure, the communication unit may be further configured to receive, from the electronic device, an invitation request for allowing another user to participate in the AI training, and the processor may be further configured to group the user and the another user for the AI training.

According to an embodiment of the present disclosure, a system for providing a user-participating-type AI (Artificial Intelligence) training service is provided. The system may include a first electronic device configured to provide, through a screen of the first electronic device, an initial setting UI (User Interface) and an AI training UI, and to receive, from a user of the service, initial setting user inputs about an initial setting for AI training and an AI training user input for requesting for the AI training; and a service providing server configured to receive, from the first electronic device, a request for the initial setting and the AI training, to execute, based on the received requests, the initial setting for AI training and AI training, and to transmit, to the first electronic device, initial setting data and/or AI training data corresponding to the executed initial setting and AI training. The initial setting user inputs may include a user input selecting a subject for the AI training, a user input selecting an AI algorithm from AI algorithms, a user input determining a type of input data for the AI training, and a user input determining a plurality of behavior patterns of the subject.

According to various embodiments of the present disclosure, the first electronic device may be further configured to receive, from the service providing server, a user input requesting for information on an AI training algorithm, and to transmit, to the service providing server, a request for the information on the AI training algorithm, and the service providing server may be further configured to generate the information on the AI training algorithm as a result of the AI training if the number of the AI training being executed exceeds a predetermined threshold, and to transmit, to the first electronic device, the information on an AI training algorithm.

According to various embodiments of the present disclosure, the information on the AI training algorithm may be exclusive information for a user account of the user.

According to various embodiments of the present disclosure, the system may further include a second electronic device of another user using the service. The first electronic device may be further configured to receive an invitation user input allowing the another user to participate in the AI training, and to transmit, to the service providing server, an invitation request corresponding to the invitation user input, and the service providing server may be further configured to group the user and the another user for the AI training.

According to various embodiments of the present disclosure, the service providing server may be further configured to receive, from the first electronic device or the second electronic device, another request for the AI training, to execute the AI training in response to the received another request, to generate AI training data corresponding to the executed AI training, and to transmit, to the first electronic device and the second electronic device, the generated AI training data.

According to an embodiment of the present disclosure, a method, performed by an electronic device, of providing a user-participating-type AI (Artificial Intelligence) training service is provided. The method may include providing, through a screen of the electronic device, an initial setting UI (User Interface); receiving, from a user of the service, initial setting user inputs about an initial setting for AI training; transmitting, to a service providing server, data corresponding to the initial setting user inputs; providing, through a screen of the electronic device, an AI training UI; receiving, from the user of the service, an AI training user input for requesting for the AI training; transmitting, to the service providing server, data corresponding to the AI training user input; and receiving, from the service providing server, initial setting data and/or AI training data generated based on the transmitted data. The initial setting user inputs may include a user input selecting a subject for the AI training, a user input selecting an AI algorithm from AI algorithms, a user input determining a type of input data for the AI training, and a user input determining a plurality of behavior patterns of the subject.

According to an embodiment of the present disclosure, a method, performed by a service providing server, of providing a user-participating-type AI (Artificial Intelligence) training service is provided. The method may include receiving, from an electronic device of a user using the service, a request for an initial setting for AI training and a request for the AI training; executing, based on the received request, the initial setting for the AI training and the AI training; and transmitting, to the electronic device, initial setting data and/or AI training data respectively corresponding to the executed initial setting and the executed AI training. The request for the initial setting may include a subject for the AI training, an AI algorithm from AI algorithms, a type of input data for the AI training, and a plurality of behavior patterns of the subject.

According to an embodiment of the present disclosure, a method, performed by a system including a first electronic device and a service providing server, of providing a user-participating-type AI (Artificial Intelligence) training service is provided. The method may include providing, by the first electronic device, through a screen of the first electronic device, an initial setting UI (User Interface) and an AI training UI; receiving, by the first electronic device, from a user of the service, initial setting user inputs about an initial setting for AI training and an AI training user input for requesting for the AI training; receiving, by the service providing server, from the first electronic device, a request for the initial setting and the AI training; executing, by the service providing server, based on the received requests, the initial setting for the AI training and the AI training; and transmitting, by the service providing server, to the first electronic device, initial setting data and/or AI training data respectively corresponding to the executed initial setting and the executed AI training. The initial setting user inputs may include a user input selecting a subject for the AI training, a user input selecting an AI algorithm from AI algorithms, a user input determining a type of input data for the AI training, and a user input determining a plurality of behavior patterns of the subject.

Other embodiments, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other embodiments, features, and advantages of certain embodiments of the present disclosure will be more apparent from the following description taken in conjunction with the accompanying drawings.

Throughout the drawings, it should be noted that like reference numbers are used to depict the same or similar elements, features, and structures.

DETAILED DESCRIPTION

Figure 1:
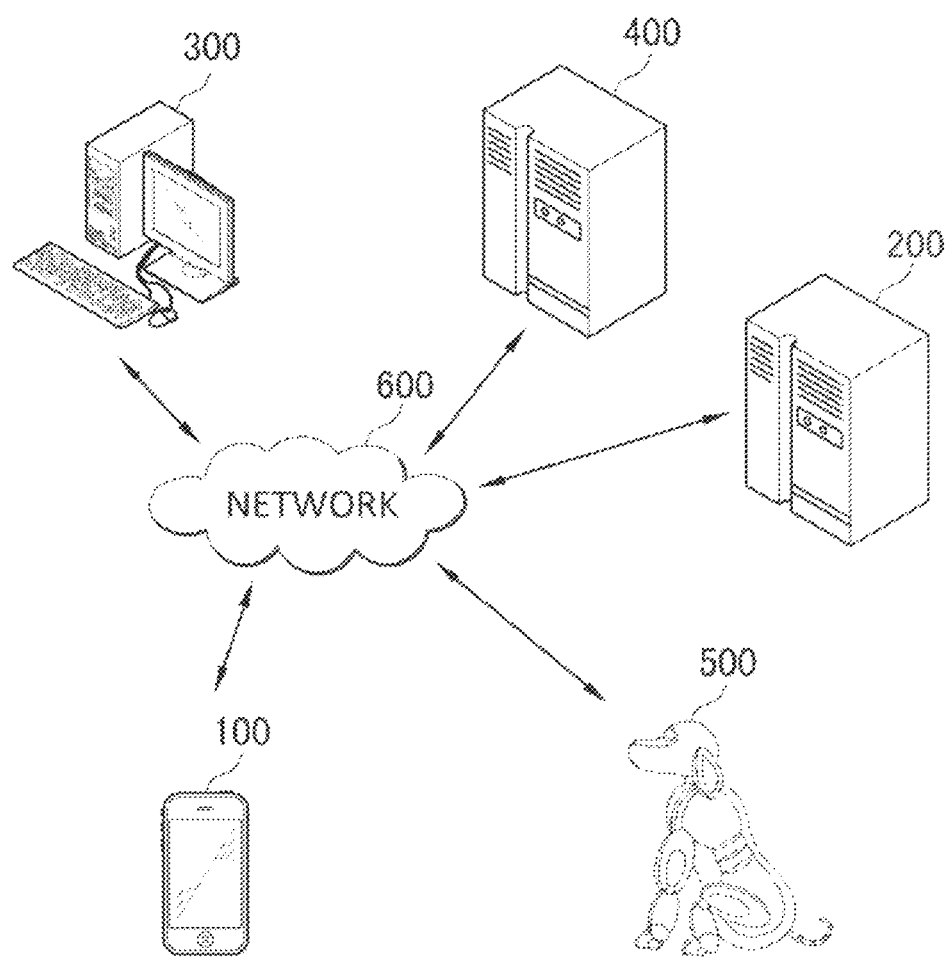
FIG. 1 is a drawing illustrating a system, including electronic devices and a service providing server, providing a user-participating-type AI (Artificial Intelligence) training service according to various embodiments of the present disclosure.

Hereinafter, the present disclosure is described with reference to the accompanying drawings. However, the present disclosure is not intended to be limited to the specific embodiments, and it is understood that it should include various modifications, equivalents, and/or alternatives according to various embodiments of the present disclosure. With respect to the descriptions of the drawings, like reference numerals refer to like elements.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A and/or B", or "one or more of A and/or B", and the like used herein may include any and all combinations of one or more of the associated listed items. For example, the term "A or B", "at least one of A and/or B", or "one or more of A and/or B" may refer to all of the case (1) where at least one A is included, the case (2) where at least one B is included, or the case (3) where both of at least one A and at least one B are included.

The expressions such as "1st", "2nd", "first", or "second", and the like used in various embodiments of the present disclosure may refer to various elements irrespective of the order and/or priority of the corresponding elements, but do not limit the corresponding elements. The expressions may be used to distinguish one element from another element. For instance, both "a first electronic device" and "a second electronic device" indicate different electronic devices from each other irrespective of the order and/or priority of the corresponding elements. For example, a first component may be referred to as a second component and vice versa without departing from the scope of the present disclosure.

It will be understood that when an element (e.g., a first element) is referred to as being "(functionally or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" should not mean "only specifically designed to." The expression "a device configured to" may mean that the device is "capable of" operating by itself, or together with another device or other components. For example, a "processor configured to perform A, B, and C" may mean a dedicated processor (e.g., an embedded processor) for performing a corresponding operation or a generic-purpose processor (e.g., a CPU (Central Processing Unit) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

FIG. 1 is a drawing illustrating a system, including electronic devices and a service providing server, providing a user-participating-type AI (Artificial Intelligence) training service (hereinafter, the AI training service) it according to various embodiments of the present disclosure. Referring to FIG. 1, the system may include a first electronic device 100, a service providing server 200, a second electronic device 300, a contents server 400, an external device 500, and a network 600. First electronic device 100 and second electronic device 200 according to various embodiments of the present disclosure may include at least one of smart-phones, smart-pads, tablet PCs (Personal Computers), desktop PCs, laptop PCs, netbook computer, workstations, wearable devices (e.g., HMDs (Head-Mounted-Devices) or smart-watches), TV boxes (e.g., Samsung HomeSync™, Apple TV™, or Google TV™), or game consoles (e.g., Xbox™, PlayStation™, or Switch™.)

First electronic device 100 may receive items to be provided for an initial setting for AI training from a user using the service. The items may include a subject for the AI training, an AI algorithm selected from AI algorithms, a type of input data for the AI training, and a plurality of behavior patterns of the subject to be used for the AI training.

According to various embodiments of the present disclosure, the subject may not be limited to a specific type. For example, the subject may include persons, pets, various comic characters, various movie characters, celebrities, toys, or robots, etc. According to various embodiments of the present disclosures, first electronic device 100 may determine specific parts for the subject. For example, if a pet puppy is selected for the subject, first electronic device 100 may determine a breed, an age, a sex, a size, and details of a shape (e.g., eyes, a nose, a mouth, ears, color for hair, or a tail, etc.) for the pet puppy.

According to various embodiments of the present disclosure, the AI algorithms may include a perceptron, a neural network, a SVM (Support Vector Machine), and a deep learning. However, the AI algorithms may not be limited to the above kinds of algorithms and may include other algorithms to be developed later.

According to various embodiments of the present disclosure, the type of input data for the AI training may include a text, a voice, an image, and a video. However, the type of the input data may not exclude a sound except the voice. For example, the type of the input data may include the voice, a sound of animals, a sound of environments, a sound of musical instruments, an electric sound, etc.

According to various embodiments of the present disclosure, the plurality of behavior patterns of the subject may be predetermined patterns for the behaviors of the subject and may be different depending on which subjects are selected. For example, if a pet puppy is selected for the subject, the behavior patterns may include rolling, sitting down, standing up, barking, running, and giving a paw, etc. Hereinafter, it will be described that the subject for the AI training is a pet puppy as an example. However, the subject according to various embodiments of the present disclosure may not be limited to the pet puppy, thus other components may not be limited to components corresponding to the pet puppy.

According to various embodiments of the present disclosure, first electronic device 100 may provide, through a display device, the user with an initial setting UI (User Interface) to receive user inputs, from the user, selecting the subject, the AI algorithm, the type of input data, and the behavior patterns. First electronic device 100 may provide the initial setting UI by using data pre-stored in a memory of first electronic device 100 or by using corresponding to data received from service providing server 200. The subject, the AI algorithm, the type of input data, and the behavior patterns may be displayed on the initial setting UI all at once or each of the subject, the AI algorithm, the type of input data, and the behavior patterns may be displayed on the respective UIs. According to various embodiments of the present disclosure, the display device may include, for example, a display embedded or installed on an electronic device (e.g., a LCD (Liquid Crystal Display), a LED (Light Emitting Diode) display, an OLED (Organic LED) display, a MEMS (Micro-Electro-Mechanical Systems) display, or an electronic paper display, etc.), a LED monitor, a LCD monitor, IPTV, Smart TV, or a projector connected to the electronic device directly or indirectly. Hereinafter, it will be described that the display device is a screen of first electronic device 100 as an example.

First electronic device 100 may transmit, to service providing server 200, data corresponding to the received items for the initial setting. According to various embodiments of the present disclosure, service providing server 200 may be operated as a cloud server employed by a company providing the AI training service.

Service providing server 200 may execute the initial setting for the AI training by using data, received from first electronic device 100, corresponding to the items to be provided for the initial setting.

According to various embodiments of the present disclosure, service providing server 200 may execute the initial setting after receiving respectively each of or receiving sequentially at least two of, data corresponding to the subject, the AI algorithm, the type of the input data, and the behavior patterns. However, receiving order of a plurality of the data is not limited to the data corresponding to the subject, the AI algorithm, the type of the input data, and the behavior patterns in that order.

According to various embodiments of the present disclosure, first electronic device 100 may further receive, from the user, user input determining parameter and structure provided based on the selected AI algorithm. The parameter may include at least one of the number of layers for the AI algorithm, node for each of layers, function, and the number of iterations. According to various embodiments of the present disclosure, the structure may indicate arrangement of the node, function and the number of iterations. Although the same algorithm and the same node, the same function, and the same number of iterations is determined, result of AI trainings may be different based on the arrangement. Thus, various embodiments of the present disclosure may authorize the user to determine the structure for the AI algorithm.

Because determining the parameter and the structure may be unfamiliar to the user who is not an expert, according to various embodiments of the present disclosure, first electronic device 100 or service providing server 200 may preset a default value of the parameter and the structure for user convenience. If first electronic device 100 or service providing server 200 do not receive the user input determining the parameter and the structure or receive a user input authorizing determination of the parameter and the structure to first electronic device 100 or service providing server 200, the default value may be the value for the parameter and the structure.

According to various embodiments of the present disclosure, the default value for the parameter and the structure may be various based on the selected subject, AI algorithm, type of the input data, or behavior patterns.

According to various embodiments of the present disclosure, selecting a plurality of behavior patterns may be not only selecting behavior patterns among the predetermined behavior patterns but also requesting for another behavior pattern that is not included in the predetermined behavior patterns by inputting the another behavior pattern on requesting area of the initial setting UI. According to various embodiments of the present disclosure, the predetermined behavior patterns may include a behavior pattern that any user requested for on the requesting area of the initial setting UI of his/her own electronic device. For example, if the user requests "turning a somersault" of the pet puppy through the requesting area, service providing server 200 may generate the behavior pattern "turning a somersault," and the behavior pattern "turning a somersault" may be suggested to other users with the predetermined behavior patterns. According to various embodiments of the present disclosure, a newly added behavior pattern may be suggested differently with the predetermined behavior patterns. For example, the newly added behavior pattern may be suggested to other users as a recommendation behavior pattern.

According to various embodiments of the present disclosure, the requesting area, or the recommendation behavior pattern, etc. may be suggested only to users paying for the service in contrast to users subscribing free service.

First electronic device 100 may receive an AI training user input requesting for the AI training for the selected subject. The AI training user input may include input data based on the selected type of the input data and one of the selected behavior patterns. For example, if the selected type of the input data is the text and the selected behavior patterns include sitting down, barking, and rolling, the user may input a text "sit down" and select the behavior pattern "sitting down" to request for the AI training. However, the user may input the text "sit down" and select the behavior pattern "rolling" to request for the AI training.

According to various embodiments of the present disclosure, similarly to the initial setting UI, first electronic device 100 may provide AI training UI and receive the AI training user input through the AI training UI.

First electronic device 100 may transmit, to service providing server 200, the received AI training user input, and service providing server 200 may execute the AI training based on the received AI training user input. Basically, if the AI training is once executed, result of the AI training cannot be deleted or modified because of a property of AI algorithm. Thus, if AI training which matches the text "sit down" with the behavior pattern "rolling" is mistakenly executed, more AI training which matches the text "sit down" with the behavior pattern "sitting down" may practically overwrite the result of the AI training.

Service providing server 200 may transmit, to first electronic device 100, data corresponding to the executed AI training. If the conducted AI training include the behavior pattern "sitting down" matched with the text "sit down", first electronic device 100 may provide, through the screen, the user with a scene that the puppy pet is sitting down in response to the text "sit down" by using the received data corresponding to the executed AI training.

According to various embodiments of the present disclosure, first electronic device 100 may limit a data size of the input data included in the AI training user input within a predetermined threshold. If the type of the input data is the text, first electronic device 100 may, for example, allow the text under 10 letters. If the type of the input data is the voice, first electronic device 100 may, for example, allow the voice under 3 seconds. Furthermore, if the type of the input data is the image, first electronic device 100 may, for example, limit a resolution or a data size of the image. If the type of the input data is the video, first electronic device 100 may limit a resolution, a data size, or a length of the video.

According to various embodiments of the present disclosure, if the type of the input data is the voice, service providing server 200 may use the voice for the AI training as identification information for the user. Thus, service providing server 200 may not execute the AI training for the puppy pet in case of receiving a voice of another user. According to various embodiments of the present disclosure, the voice may include timbre, loudness, pitch, or tone as the identification information. Furthermore, if the type of the input data is the voice, first electronic device 100 may request for repeating the voice for consistency of the AI training.

According to various embodiments of the present disclosure, if the type of the input data is the image, service providing server 200 may retrieve similar images from contents server 400 and process the similar images equally to the input image. For example, service providing server 200 may execute AI training for the retrieved similar images as well as the input image by matching with a behavior pattern matched with the input image. According to various embodiments of the present disclosure, contents server 400 may be a server operated by a company providing the AI training service or another company providing image search service from an input image, for example, Google™.

According to various embodiments of the present disclosure, first electronic device 100 may reduce a data size of the input data by preprocessing the input data. Through the preprocessing first electronic device may shorten a response time in terms of communication with service providing server 200. For example, if the type of the input data is the voice, the preprocessing may be analyzing and converting the voice to the text. If the type of the input data is the image, the preprocessing may be converting meaning of the image to the text through image processing. Otherwise, the preprocessing may be reducing the data size by simply changing file format of, reducing a bit rate or definition of, or file compressing the voice, the image, or the video.

According to various embodiments of the present disclosure, if needed, first electronic device 100 may encrypt the input data and transmit the encrypted input data to service providing server 200 if the input data includes personal information. In this case, service providing server 200 may decrypt the input data by using an encryption key or OTP (One Time Password.)

According to various embodiments of the present disclosure, first electronic device 100 may receive, from the user, an invitation user input requesting for making another user participate in the AI training for the subject and transmit, to service providing server 200, data corresponding to the invitation user input. According to various embodiments of the present disclosure, an application providing the AI training service installed on first electronic device 100 may be interlocked with a phone book application or a SNS (Social Networking Service) application. Thus, the user may input the invitation user input, through the application providing the AI training service, selecting the another user stored on the phone book application or registered as a friend on the SNS application.

According to various embodiments of the present disclosure, service providing server 200 may transmit, to another user's electronic device (e.g., second electronic device 300,) a request for inviting the another user. If second electronic device 300 accepts the invitation, service providing server 200 may organize the user and another user as one group. In this case, the another user may execute the AI training by using second electronic device 300 under the initial setting set by the user. Furthermore, logs of AI training executed by each of first electronic device 100 and second electronic device 300 may be shared between first electronic device 100 and second electronic device 300. According to various embodiments of the present disclosure, each of the user and the another user may watch the logs of AI training executed by each of first electronic device 100 and second electronic device 300 on a chat room generated by service providing server 200.

According to various embodiments of the present disclosure, first electronic device 100 may receive, from the user, a user input requesting for information on an AI training algorithm. The information on the AI training algorithm may be exclusive information for a user account of the user. According to various embodiments of the present disclosure, the information on the AI training algorithm may be generated as a result of the AI training if the number of the AI training being executed exceeds a predetermined threshold. The information on the AI training algorithm may be programming/coding data corresponding to the AI training executed so far or data simply showing a training state of the subject as the result of the AI training.

According to various embodiments of the present disclosure, first electronic device 100 may transmit, to service providing server 200, a request for the information on the AI training algorithm based on the received user input requesting for the information on the AI training algorithm. Service providing server 200 may generate the information on the AI training algorithm and transmit the generated information on the AI training algorithm to first electronic device 100. According to various embodiments of the present disclosure, the generated information on the AI training algorithm may be transmitted to first electronic device 100 with encryption.

According to various embodiments of the present disclosure, service providing server 200 may generate and transmit, to first electronic device 100, the information on the AI training algorithm if a predetermined condition is met. For example, service providing server 200 may generated the information on the AI training algorithm based on accuracy or reliability of a result of the AI training. If the AI training is executed by matching the text "sit down" with the behavior pattern "rolling," service providing server 200 may not generate the information on the AI training algorithm. If the text "sit down" is correctly matched with the behavior pattern "sitting down", but a text "sit" is matched with the behavior "rolling", service providing server 200 may not generate the information on the AI training algorithm because of inconsistency.

According to various embodiments of the present disclosure, the transmitting the information on the AI training algorithm may be a handover of a copyright of the information on the AI training algorithm. If the AI training is executed by the user and another user, the information on the AI training algorithm may belong to each of the user and another user and the copyright may be shared between the user and the another user.

Service providing server 200 may share the result of the AI training executed by the user with other users of the AI training service. According to various embodiments of the present disclosure, the result of the AI training may be the information on the AI training algorithm. However, the result of the AI training may be other information different from the information on the AI training algorithm. For example, the other users of the AI training service may bring data of the pet puppy AI-trained by the user and check that what would the pet puppy do when receiving input data based on the result of the AI training although the other users cannot execute the AI training for the pet puppy. That is to say, it is similar to a document executed through a program allowing reading the document except editing (e.g. Adobe Acrobat Reader™.) According to various embodiments of the present disclosure, the result of the AI training may include the number of the AI training being executed. The number of the AI training may help the other users make a judgement whether the AI training is sufficiently executed or not and induce the other users to use the information on the AI training algorithm.

External device 500, for example, may be various forms of robots and be operated by using the AI algorithm. First electronic device 100 may transmit, to external device 500, the information on the AI training algorithm received from service providing server 200. The information on the AI training algorithm may make the robot to act based on the result of the AI training executed by the user. According to various embodiments of the present disclosure, first electronic device 100 may be operated as an input device (e.g., a remote controller) for external device 500. The user may input the input data, such as the text, the voice, the image, or the video to act external device 500 as the AI-trained subject for the AI training. In this case, first electronic device 100 may provide the user with a UI controlling external device 500 on the screen. According to various embodiments of the present disclosure, if the type of the input data is the voice, a microphone installed in external device 500 may act as the input device.

According to various embodiments of the present disclosure, first electronic device 100 may request service providing server 200 to transmit the information on the AI training algorithm to external device 500. Otherwise, first electronic device 100 may directly transmit the information on the AI training algorithm to external device 500. In this case, first electronic device 100 may use near field communication to transmit the information on the AI training algorithm.

According to various embodiments of the present disclosure, the information on the AI training algorithm that first electronic device 100 or service providing server 200 transmits may be encrypted information.

According to various embodiments of the present disclosure, external device 500 may be a ready-made product, or a product customized to fit the subject corresponding to the initial setting. For example, service providing server 200 may request a manufacturer to craft the product customized to the subject. In this case, service providing server 200 may transmit the request for the customized product in case of permission of the user.

Network 600 may mean a connection structure which allows nodes such as terminals and servers to exchange information and may include at least one of telecommunications networks, for example, a computer network (e.g., LAN or WAN), the Internet, or a telephone network. According to various embodiments of the present disclosure, first electronic device 100, service providing server 200, second electronic device 300, contents server 400, and external device 500 may be connected to network 600 and communicate to each other through a wireless communication and a wired communication. The wireless communication may include at least one of, for example, LTE, LTE-A, CDMA, WCDMA, UMTS, WiBro, GSM, or the like, as cellular communication protocol. Furthermore, the wireless communication may include, for example, a local area network. The local area network may include at least one of a Wi-Fi, NFC (Near Field Communication), a GPS (Global Positioning System), or the like. The wired communication may include at least one of, for example, a USB (Universal Serial Bus), a HDMI (High Definition Multimedia Interface), a RS-132 (Recommended Standard-132), or a POTS (Plain Old Telephone Service).

Figure 2:
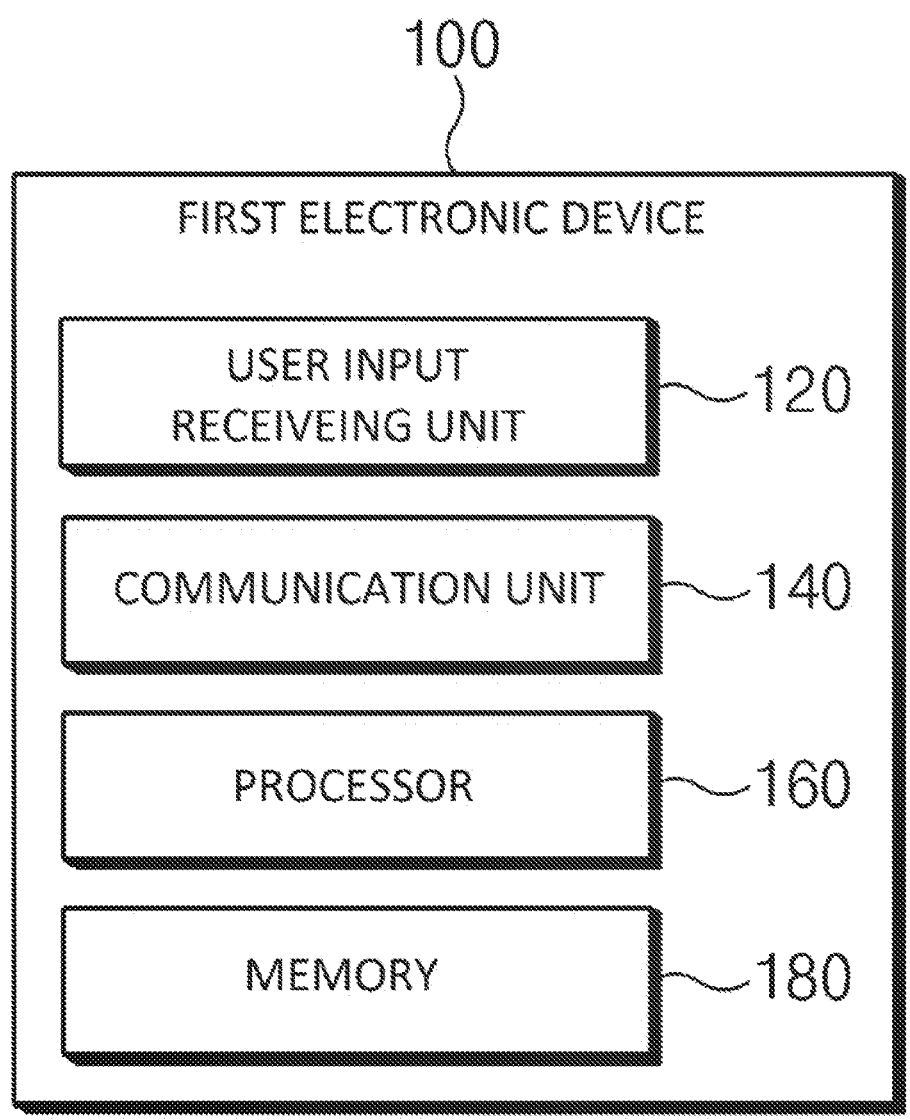
FIG. 2 is a block diagram illustrating a configuration of an electronic device according to various embodiments of the present disclosure.

FIG. 2 is a block diagram illustrating a configuration of an electronic device according to various embodiments of the present disclosure. Referring to FIG. 2, first electronic device 100 may include a user input receiving unit 120, a communication unit 140, a processor 160, and a memory 180. Herein, first electronic device 100 shown in FIG. 2 may be only an implementation example. Various modifications are possible according to the elements shown in FIG. 2. For example, first electronic device 100 may further include user interfaces for receiving any instruction or information from a user of first electronic device 100. According to various embodiments of the present disclosure, through a display device, first electronic device 100 may display a UI (User Interface) to provide the AI training service and receive a user input. The display device may be a wired or wireless device connected to first electronic device 100 or an integral device installed on first electronic device 100.

User input receiving unit 120 may receive a user input from a user of the AI training service. The user input may include a plurality of initial setting user inputs to be provided to initial setting for AI training and an AI training user input requesting for the AI training. According to various embodiments of the present disclosure, the plurality of initial setting user input may be input through an initial setting UI and the AI training user input may be input through an AI training UI.

According to various embodiments of the present disclosure, the initial setting user input may include a user input selecting a subject for the AI training, a user input selecting an AI algorithm from AI algorithms, a user input determining at least one type of input data for the AI training, and a user input determining a plurality of behavior patterns of the subject to be provided at the AI training. Furthermore, the initial setting user input may further include a user input determining parameter and structure provided based on the selected AI algorithm.

According to various embodiments of the present disclosure, the AI training user input may include the input data input by the user based on the determined type of the input data and one behavior pattern selected from the plurality of behavior patterns.

According to various embodiments of the present disclosure, user input receiving unit 120 may receive an invitation user input allowing another user to participate in the AI training. The invitation user input may be received through an application providing the AI training service by selecting another user stored another application (e.g., a phone book application or SNS (Social Networking Service) application, etc.) interlocked with the application.

According to various embodiments of the present disclosure, user input receiving unit 120 may receive a user input requesting for information on an AI training algorithm. According to various embodiments of the present disclosure, the information on the AI training algorithm may be programming/coding data corresponding to the AI training executed so far or data simply showing a training state of the subject as the result of the AI training.

According to various embodiments of the present disclosure, user input receiving unit 120 may receive a user input requesting for transmitting the information on the AI training algorithm to external device 500.

Communication unit 140 may transmit and receive data through network 600. According to various embodiments of the present disclosure, communication unit 140 may be a communication module of first electronic device 100.

Communication unit 140 may transmit, to service providing server 200, the plurality of the initial setting user inputs received at user input receiving unit 120. According to various embodiments of the present disclosure, communication unit 140 may transmit, to service providing server 200, the plurality of the initial setting user inputs all at once or after all of the initial setting user inputs are received. Otherwise, communication unit 140 may transmit, to service providing server 200, each of the initial setting user inputs in turn depending on the order that each of the initial setting user inputs is received.

It is described that communication unit 140 transmit the user inputs to service providing server 200 for convenience of explanation, however, actually it may be not the user inputs but a plurality of data corresponding each of the user inputs that communication unit 140 may transmit to service providing server 200. Furthermore, hereinafter, above description may be applied to data that communication unit 140 transmits or receives as well as user inputs.

Communication unit 140 may transmit, to service providing server 200, the AI training user input received at user input receiving unit 120. According to various embodiments of the present disclosure, communication unit 140 may receive, from service providing server 200, data corresponding to the AI training executed by service providing server 200 in response to the transmitted AI training user input.

According to various embodiments of the present disclosure, communication unit 140 may transmit, to service providing server 200, the invitation user input received at user input receiving unit 120. If the invitation for the another user is executed by not service providing server 200 but processor 160, communication unit 140 may transmit the invitation user input to second electronic device 300.

According to various embodiments of the present disclosure, communication unit 140 may request service providing server 200 to transmit the information on the AI training algorithm. Furthermore, communication unit 140 may receive the information on the AI training algorithm from service providing server 200.

According to various embodiments of the present disclosure, communication unit 140 may transmit, to external device 500, the information on the AI training algorithm directly or through service providing server 200.

Processor 160 may include one or more of a CPU (Central Processing Unit), an AP (Application Processor), or a CP (Communication Processor). Processor 160 may perform, for example, calculation or data processing about control and/or communication of at least another of the components of first electronic device 100 such as user input receiving unit 120, communication unit 140, or memory 180.

Processor 160 may generate the initial setting UI and the AI training UI. For example, processor 160 may generate the initial setting UI and the AI training UI by using data pre-stored in memory 180 or data received from service providing server 200. Processor 160 may provide the user with the generated initial setting UI and the generated AI training UI through a display device.

According to various embodiments of the present disclosure, processor 160 may preprocess the input data included the AI training user input. Through the preprocessing a data size of the input data may be reduced, and it may shorten a response time while communicating with service providing server 200.

According to various embodiments of the present disclosure, processor 160 may provide, on the AI training UI, data corresponding to the AI training received from service providing server 200. For example, if the AI training matching the text "sit down" with the behavior pattern "sitting down" is executed, processor 160 may provide, through the AI training UI, the user with an action that the pet puppy is sitting down in response to the text "sit down."

Memory 180 may store data, for example, instructions about operations performed by first electronic device 100. In this case, the data stored in the memory 180 may include data input and output between respective components inside first electronic device 100 and may include data input and output between components outside first electronic device 100 and components inside first electronic device 100. For example, memory 180 may store information on the initial setting user inputs received at user input receiving unit 120. Furthermore, memory 180 may store the information on the AI training algorithm received from service providing server 200.

According to various embodiments of the present disclosure, memory 180 may include a hard disc drive, a ROM (Read Only Memory), a RAM (Random Access Memory), a flash memory, a memory card, and the like inside or outside first electronic device 100.

It should be well understood to those skilled in the art that user input receiving unit 120, communication unit 140, processor 160, and memory 180 may be implemented to be independent of each other or may be implemented such that one or more of them are integrated into one device in first electronic device 100.

Figure 3:
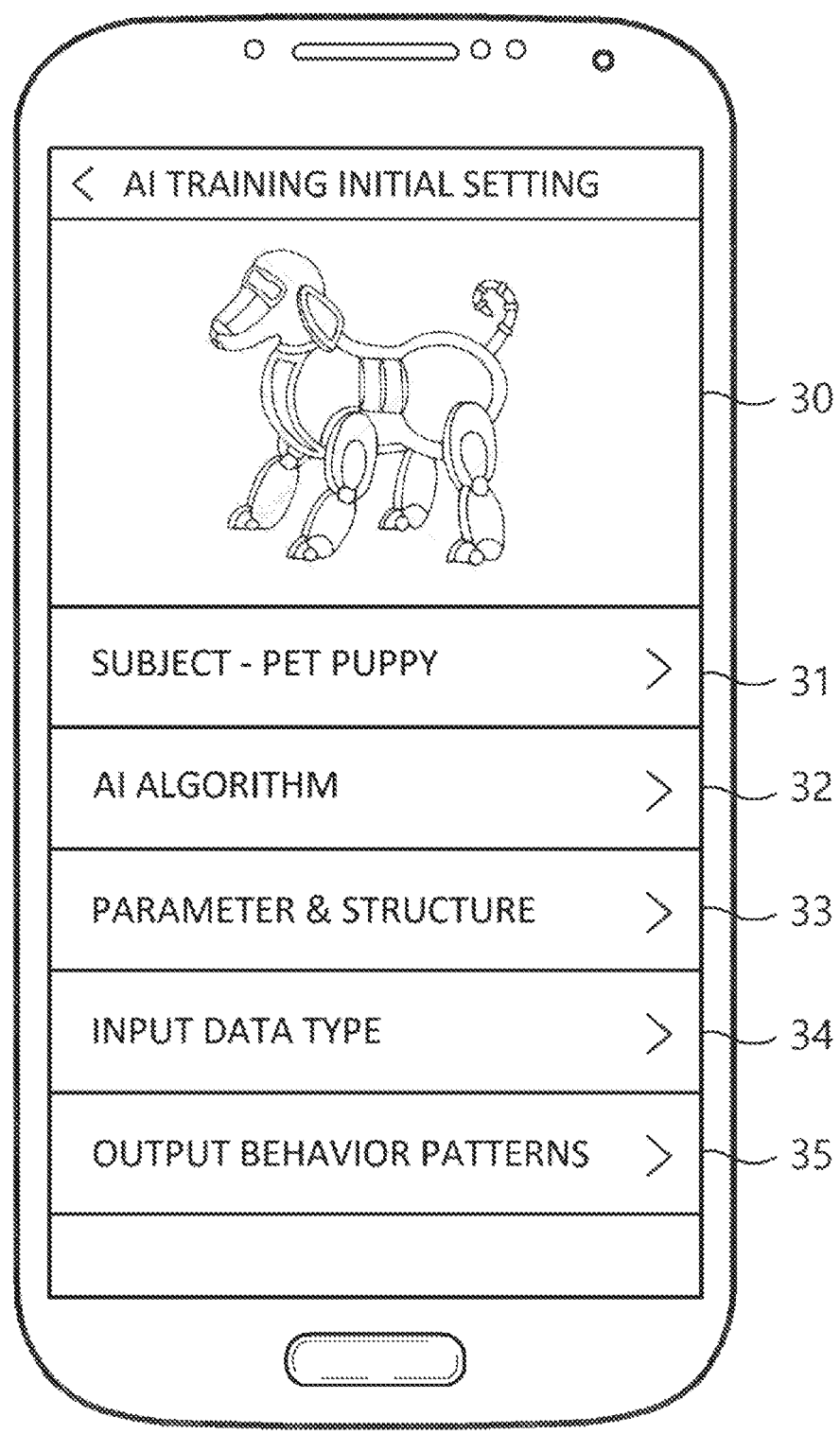
FIG. 3 is a drawing illustrating an initial setting UI (User Interface) displayed on a screen of an electronic device according to various embodiments of the present disclosure.

FIG. 3 is a drawing illustrating an initial setting UI (User Interface) displayed on a screen of an electronic device according to various embodiments of the present disclosure.

The initial setting UI may be comprised to perform an initial setting for an AI training as a preliminary step of the AI training. Referring to FIG. 3, through the initial setting UI may include items of a subject 31 for the AI training, an AI algorithm 32, a parameter and a structure 33, a type of input data 34, and an output behavior patterns 35.

According to various embodiments of the present disclosure, the user may set subject 31 for the AI training, AI algorithm 32, parameter and structure 33, type of the input data 34, and output behavior patterns 35 by selecting each of items.

The initial setting UI shown in FIG. 3 may represent a moment that the pet puppy is selected for subject 31. The initial setting UI may display an image corresponding to the selected pet puppy on a subject area 30. Referring to FIG. 3, the pet puppy is shown as a robot dog, however, according to various embodiments of the present disclosure, the pet puppy may be described as a real puppy.

Figure 4:
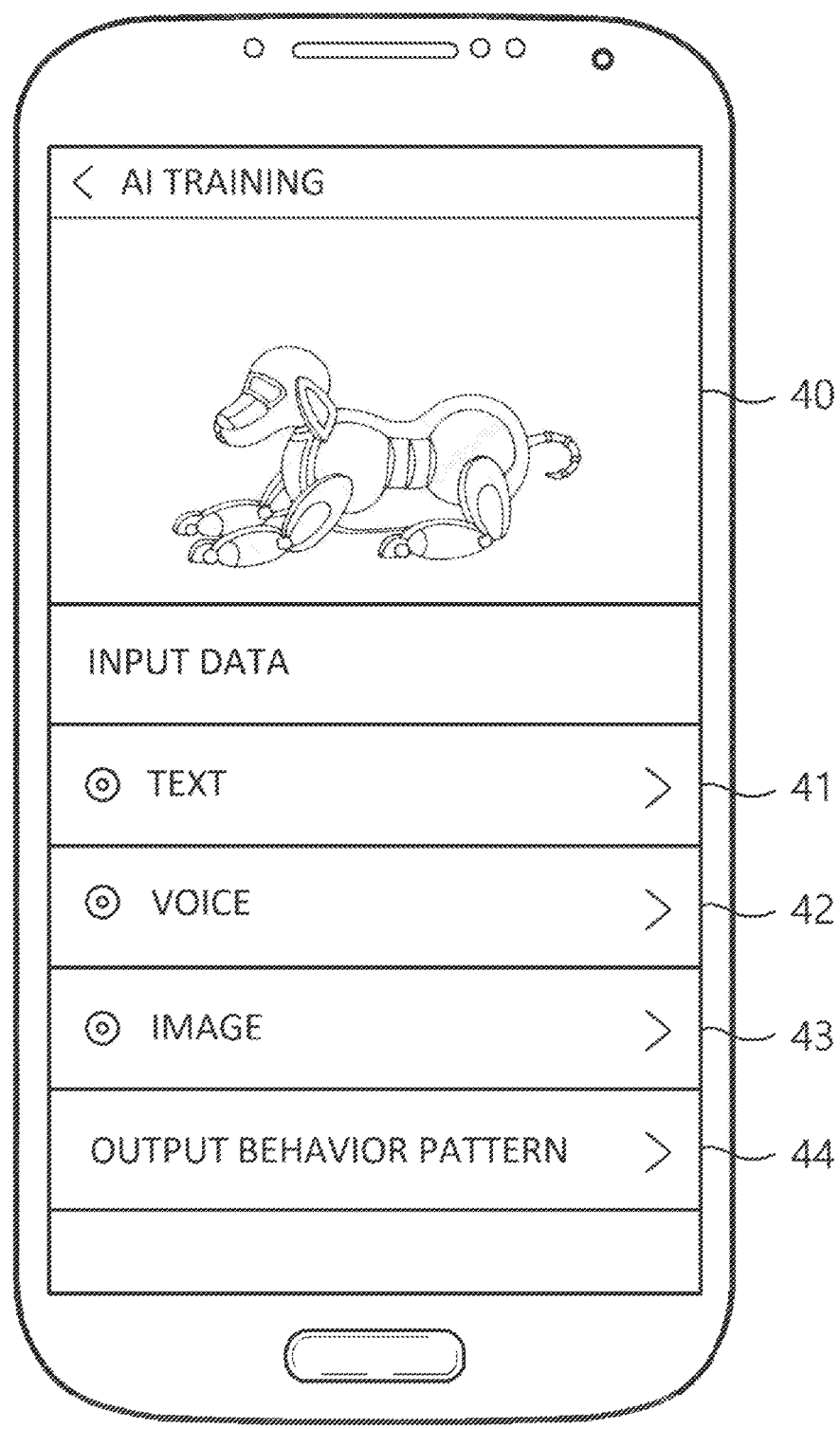
FIG. 4 is a drawing illustrating an AI training UI (User Interface) displayed on a screen of an electronic device according to various embodiments of the present disclosure.

FIG. 4 is a drawing illustrating an AI training UI (User Interface) displayed on a screen of an electronic device according to various embodiments of the present disclosure.

The AI training UI in FIG. 4 may be to request service providing server 200 to execute an AI training, a user may select a type of input data and a behavior pattern 44. Referring to FIG. 4, the input data may be input by selecting at least one of the types of the input data including a text 41, a voice 42, and an image 43. The type of the input data may include at least one type determined through type of the input data 34 of the initial setting UI in FIG. 3. Furthermore, if behavior pattern 44 may selected, a plurality of behavior patterns determined through output behavior patterns 35 of the initial setting UI in FIG. 3 may be displayed and one of the plurality of the behavior patterns may be selected.

The AI training UI shown in FIG. 4 may represent a moment that a behavior pattern "sitting down" is selected for behavior pattern 44. The AI training UI may display an image corresponding to the selected behavior pattern on a behavior pattern area 40.

First electronic device 100 may display the behavior pattern "sitting down" of the pet puppy on the behavior pattern area 40 by using data prestored in memory 180 when the behavior pattern "sitting down" is selected. According to various embodiments of the present disclosure, first electronic device 100 may transmit, to service providing server 200, the input data and the selected behavior pattern "sitting down", and may display the behavior pattern "sitting down" by using data received from service providing server 200 in response to the transmitted behavior pattern "sitting down."

Figure 5:
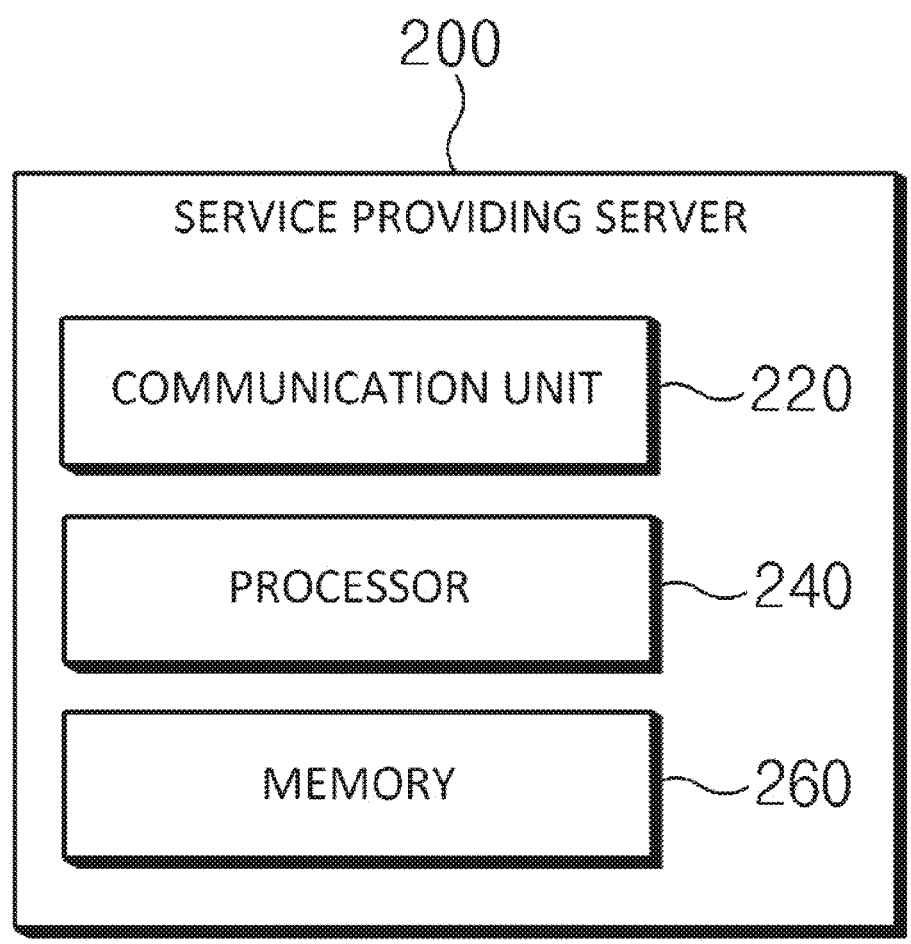
FIG. 5 is a block diagram illustrating a configuration of a service providing server according to various embodiments of the present disclosure.

FIG. 5 is a block diagram illustrating a configuration of a service providing server according to various embodiments of the present disclosure. Service providing server 200 may include a communication unit 220, a processor 240, and a memory 260. Herein, service providing server 200 shown in FIG. 5 may be only an implementation example, and various modifications are possible according to the elements shown in FIG. 5.

Communication unit 220 may transmit and receive data through network 600. According to various embodiments of the present disclosure, communication unit 220 may be a communication module of service providing server 200.

Communication unit 220 may receive, from first electronic device 100, data corresponding to a plurality of initial setting user inputs. Communication unit 220 may receive each of the data respectively corresponding to the plurality of the initial setting user inputs all at once or separately. Communication unit 220 may transmit a result of the initial setting for the AI training in response to the received initial setting user inputs.

Communication unit 220 may receive, from first electronic device 100, data corresponding to an AI training user input. Communication unit 220 may transmit, to first electronic device 100, data corresponding to an executed AI training in response to the received AI training user input.

According to various embodiments of the present disclosure, communication unit 220 may receive, from first electronic device 100, data corresponding to an invitation user input. Communication unit 220 may transmit, to second electronic device 300 that is owned by another user who is an invitee, a log of the invitation.

According to various embodiments of the present disclosure, communication unit 220 may receive, from first electronic device 100, a request for information on AI training algorithm. Communication unit 220 may transmit the requested information on AI training algorithm to first electronic device 100 in response to the request for the information on the AI training algorithm.

According to various embodiments of the present disclosure, communication unit 220 may receive, from first electronic device 100, a request for connection with external device 500. Communication unit 220 may transmit, to external device 500, data to be used to operate external device 500 in response to the request for the connection with external device 500. According to various embodiments of the present disclosure, the data to be used to operate external device 500 may be the information on the AI training algorithm.

Processor 240 may include one or more of a CPU (Central Processing Unit), an AP (Application Processor), or a CP (Communication Processor). Processor 240 may perform, for example, calculation or data processing about control and/or communication of at least another of the components of service providing server 200 such as communication unit 220, or memory 260.

Processor 240 may execute the initial setting for the AI training based on the data corresponding to the plurality of the initial setting user inputs received at communication unit 220. According to various embodiments of the present disclosure, processor 240 may execute the initial setting for the AI training and generate a chat room to be provided to the user of first electronic device 100. In this case, a range of the AI training requested on the chat room may be restricted to the initial setting.

According to various embodiments of the present disclosure, processor 240 may analyze and apply a parameter and a structure determined at the initial setting user input to execute the initial setting.

Processor 240 may execute the AI training based on the data corresponding to the AI training user input received at communication unit 220.

According to various embodiments of the present disclosure, processor 240 may interlock an account of the user of first electronic device 100 with an account of the invitee using second electronic device 300 based on the data corresponding to the invitation user input received at communication unit 220. According to various embodiments of the present disclosure, processor 240 may invite the invitee to the generated chat room that is provided to the user.

According to various embodiments of the present disclosure, processor 240 may generate the information on the AI training algorithm based on the request for the information received at communication unit 220. According to various embodiments of the present disclosure, processor 240 may generate the information on the AI training algorithm that is applicable to all or at least one of AI algorithms (e.g., perceptron, neural network, SVM, deep learning.) That is to say, the generated information on the AI training algorithm may be compatible with other information on the AI training algorithm generated by other AI algorithms.

Memory 260 may store data, for example, instructions about operations performed by service providing server 200. In this case, the data stored in the memory 260 may include data input and output between respective components inside service providing server 200 and may include data input and output between components outside service providing server 200 and components inside service providing server 200. For example, memory 260 may store the information on the initial setting user inputs generated by processor 240.

According to various embodiments of the present disclosure, memory 260 may include a hard disc drive, a ROM (Read Only Memory), a RAM (Random Access Memory), a flash memory, a memory card, and the like inside or outside service providing server 200.

It should be well understood to those skilled in the art that communication unit 220, processor 240, and memory 260 may be implemented to be independent of each other or may be implemented such that one or more of them are integrated into one device in service providing server 200.

Figure 6:
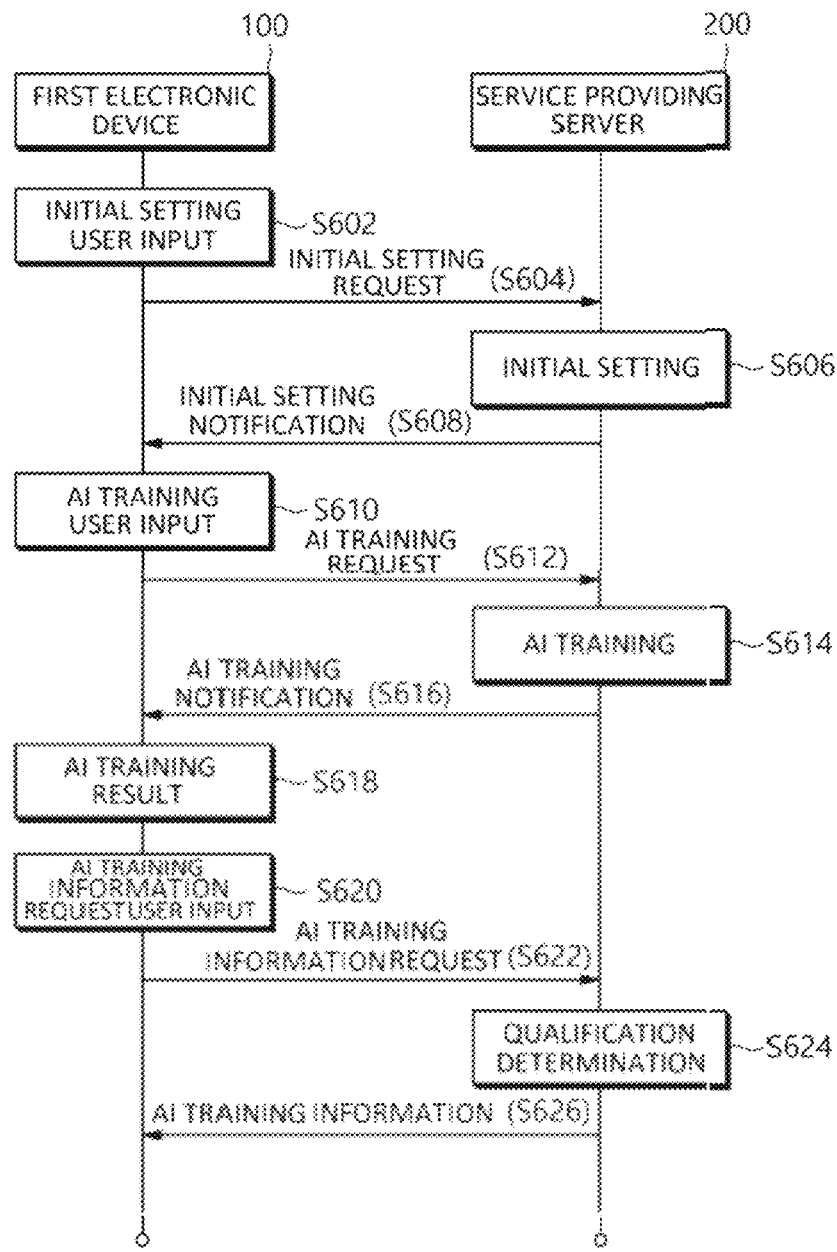
FIG. 6 is a drawing illustrating a method of providing a user-participating-type AI (Artificial Intelligence) training service according to various embodiments of the present disclosure.

FIG. 6 is a drawing illustrating a method of providing a user-participating-type AI (Artificial Intelligence) training service according to various embodiments of the present disclosure. The method of providing a user-participating-type AI training service according to the various embodiments illustrated in FIG. 7 may include operations sequentially processed in first electronic device 100 and service providing server 200 illustrated in FIG. 1 to FIG. 5. Accordingly, the descriptions of first electronic device 100 and service providing server 200 illustrated in FIG. 1 to FIG. 5, even though the descriptions are not provided below, may be applied to the method of providing a user-participating-type AI training service according to the various embodiments illustrated in FIG. 6.

In operation S602, first electronic device 100 may receive a user input requesting for an initial setting for AI training from a user of first electronic device 100. The user input requesting for the initial setting may include information on each of a subject for the AI training, an AI algorithm, a parameter of the AI algorithm, a structure of the AI algorithm, a type of input data, and behavior patterns.

In operation S604, first electronic device 100 may request service providing server 200 to execute the initial setting for the AI training based on the user input received in operation S602.

In operation S606, service providing server 200 may execute the initial setting for the AI training based on the request received in operation S604.

In operation S608, service providing server 200 may notify, to first electronic device 100, completion of the initial setting for the AI training executed in operation S606.

In operation S610, first electronic device 100 may receive a user input requesting for the AI training from the user. The user input requesting for the AI training may include the input data and a behavior pattern.

In operation S612, first electronic device 100 may request service providing server 200 to execute the AI training based on the user input requesting for the AI training received in operation S610.

In operation S614, service providing server 200 may execute the AI training based on the request received in operation S612.

In operation S616, service providing server 200 may notify, to first electronic device 100, completion of the AI training executed in operation S614. According to various embodiments of the present disclosure, service providing server 200 may transmit, to first electronic device 100, data corresponding to the executed AI training in addition to the notification.

In operation S618, first electronic device 100 may display, on a display device of first electronic device 100, a result of the AI training based on the completion notification of the AI training received in operation S616. For example, if the subject is a pet puppy and the input data includes a text "sit down" and a behavior pattern "sitting down," first electronic device 100 may provide the user, on the display device, with the pet puppy sitting down in response to the text "sit down."

In operation S620, first electronic device 100 may receive, from the user, a user input requesting for information on an AI training algorithm.

In operation S622, first electronic device 100 may transmit, to service providing server 200, a request for the information on the AI training algorithm based on the user input received in operation S620.

In operation S624, service providing server 200 may determine, based on the request received in operation S622, whether transmit the information on the AI algorithm to first electronic device 100 or not. According to various embodiments of the present disclosure, service providing server 200 may determine, based on the number of the AI training, accuracy or reliability of a result of the AI training, consistency, etc., whether transmit the information on the AI algorithm to first electronic device 100 or not.

If service providing server 200 determines to transmit, to first electronic device 100, the information on the AI training algorithm in operation S624, in operation S626, service providing server 200 may transmit the information on the AI training algorithm to first electronic device 100.

The order of operation S602 to operation S626 described in FIG. 6 may be just an example and thus is not limited thereto. That is, the order of the above-mentioned operations may mutually vary and some operations among them may be performed at the same time. Additionally, the above-mentioned operations may be repeated periodically at each predetermined time and may be performed again based on a user input inputted from the user.

Figure 7:
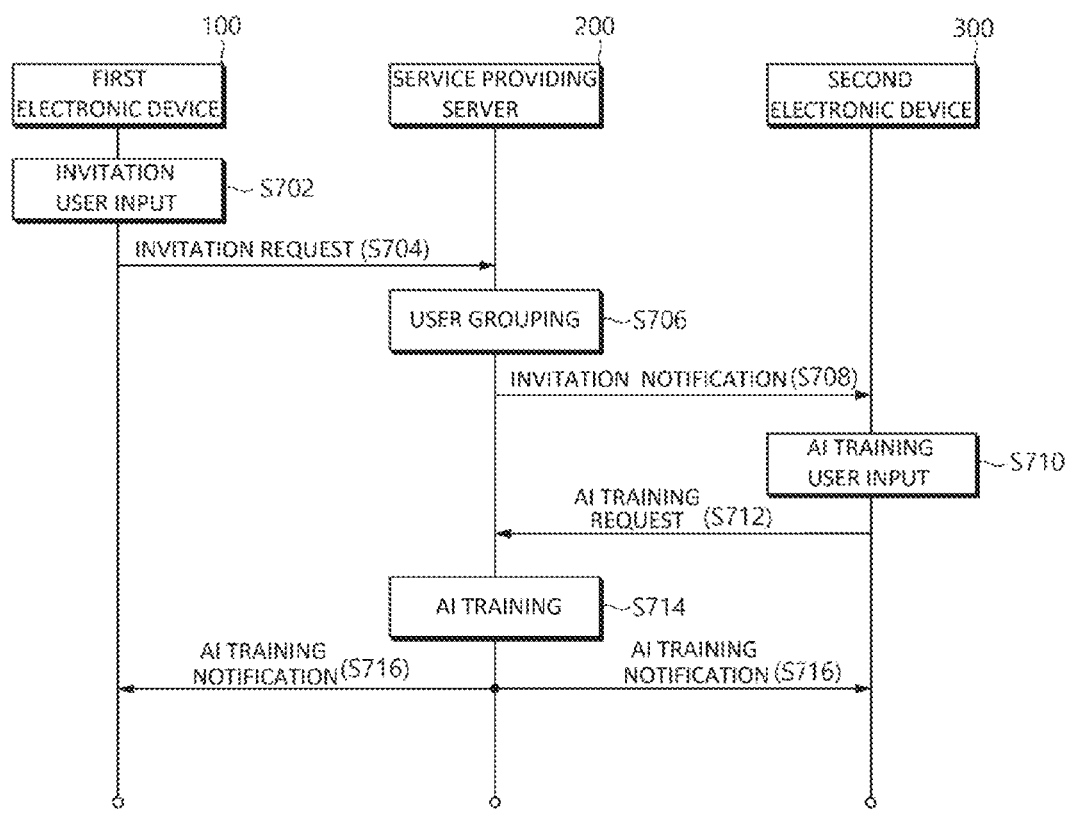
FIG. 7 is a drawing illustrating a method of providing a user-participating-type AI (Artificial Intelligence) training service according to various embodiments of the present disclosure.

FIG. 7 is a drawing illustrating a method of providing a user-participating-type AI (Artificial Intelligence) training service according to other various embodiments of the present disclosure.

The method of providing a user-participating-type AI training service according to the various embodiments illustrated in FIG. 7 may include operations sequentially processed in first electronic device 100, service providing server 200, and second electronic device 300 illustrated in FIG. 1 to FIG. 5. Accordingly, the descriptions of first electronic device 100, service providing server 200, and second electronic device 300 illustrated in FIG. 1 to FIG. 5, even though the descriptions are not provided below, may be applied to the method of providing a user-participating-type AI training service according to the various embodiments illustrated in FIG. 7.

In operation S702, first electronic device 100 may receive, from a user of first electronic device 100 (a first user), a user input inviting a user of second electronic device 300 (a second user).

In operation S704, first electronic device 100 may request service providing server 200 to invite the second user based on the user input received in operation S702.

In operation S706, service providing server 200 may administer accounts of the first user and the second user with grouping based on the request received in operation S704.

In operation S708, service providing server 200 may notify the invitation of the second user to second electronic device 300. According to various embodiments of the present disclosure, in operation S708, the invitation may be performed that service providing server 200 may invite an account of the second user into a chatroom generated by an account of the first user.

In operation S710, second electronic device 300 may receive a user input requesting for the AI training from the second user. The user input requesting for the AI training may include information on input data and a behavior pattern.

In operation S712, second electronic device 300 may request service providing server 200 to execute the AI training based on the user input received in operation S710.

In operation S714, service providing server 200 may execute the AI training based on the request received in operation S712.

In operation S716, service providing server 200 may notify completion of the AI training executed in operation S714 to first electronic device 100 and second electronic device 300. According to various embodiments of the present disclosure, service providing server 200 may notify the completion of the AI training on the chat room for the account of the first user and the second user.

The order of operation S702 to operation S716 described in FIG. 7 may be just an example and thus is not limited thereto. That is, the order of the above-mentioned operations may mutually vary and some operations among them may be performed at the same time. Additionally, the above-mentioned operations may be repeated periodically at each predetermined time and may be performed again based on a user input inputted from the user.

Figure 8:
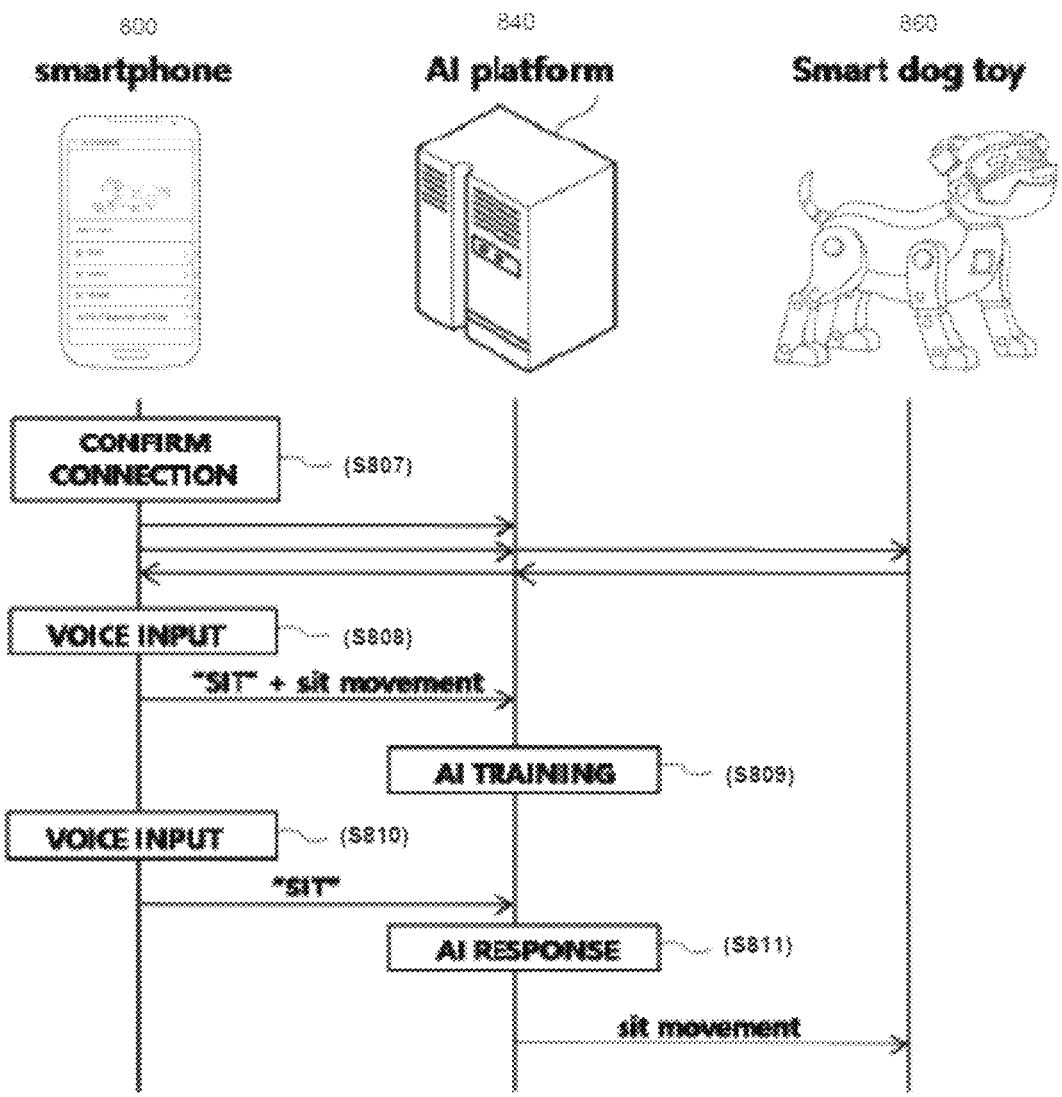
FIG. 8 is a drawing illustrating a use case of the platform with a smart pet toy according to embodiments of the present disclosure.

FIG. 8 is a drawing illustrating a use case of the platform with a smart pet toy.

A smart pet toy may collect voice of a user through a microphone as an input.

A smart pet toy may have a set of possible mechanical movements as an output.

Types of available input and output of a smart pet such as video and sound can be added or changed through the platform software update.

AI training of a smart pet toy's AI behavior may be performed via a smartphone.

The user smartphone 800 may confirm connection with the platform 840 and a smart dog toy 860 (S807).

The user may say "SIT" using a microphone of the smartphone 840 and select "sit movement" displayed in the smartphone UI (S808).

The AI platform 840 may train AI algorithm with user's "SIT" voice as input and reinforce "dog sitting movement" as a paired output (S809).

The operations S807-S809 can be repeated with different input and output pairs. For example, the user can say "DOWN" and pair with "sit movement". Also, user can say "STAY LOW" and pair with "sit movement".

An input voice received from the smartphone 800 may be sent to the AI platform 840 (S810).

In response, the platform 840 may obtain AI response based on the voice input "SIT" from the smartphone 800, and transmit instructions to the smart dog toy 860 such that the toy performs a sitting movement (S811).

Figure 9:
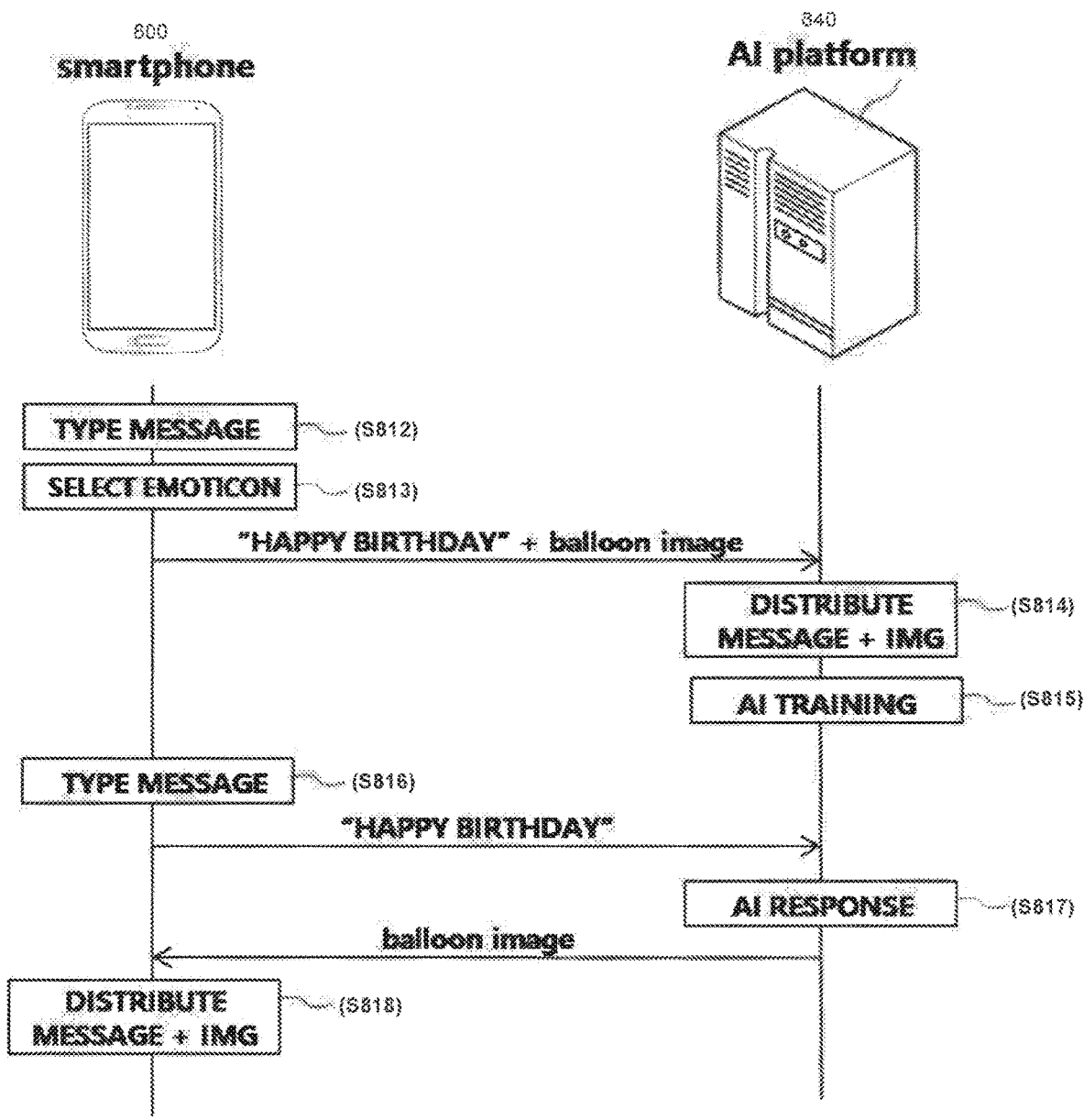
FIG. 9 is a drawing illustrating a use case of the platform with a smartphone messaging application according to embodiments of the present disclosure.

FIG. 9 is a drawing illustrating a use case of the platform with a smartphone messaging application. Here, the user may exchange messages with other users via the smartphone application. The user may select an emoticon picture paired to a certain message. The message may serve as an input of AI training and the emoticon pictures may serve as an output of AI training.

In FIG. 9, the smartphone 800 may serve as both the first electric device 100 and the second electric device 300.

The user may type a chat message "HAPPY BIRTHDAY" in the smartphone application (S812) and select an emoticon picture of "balloon" (S813).

The AI platform 840 may distribute the message and emoticon to other users (S814).

The AI platform 840 may perform AI training with the received input message and output emoticon (S815).

The operations S812-S815 may be repeated with different input and output pairs.

The user may type in and send a new message without any emoticon selected (S816). The AI platform 840 may generate a paired image using AI algorithm (S817).

A new message may be distributed together with a selected image from AI algorithm (S818).

Figure 10:
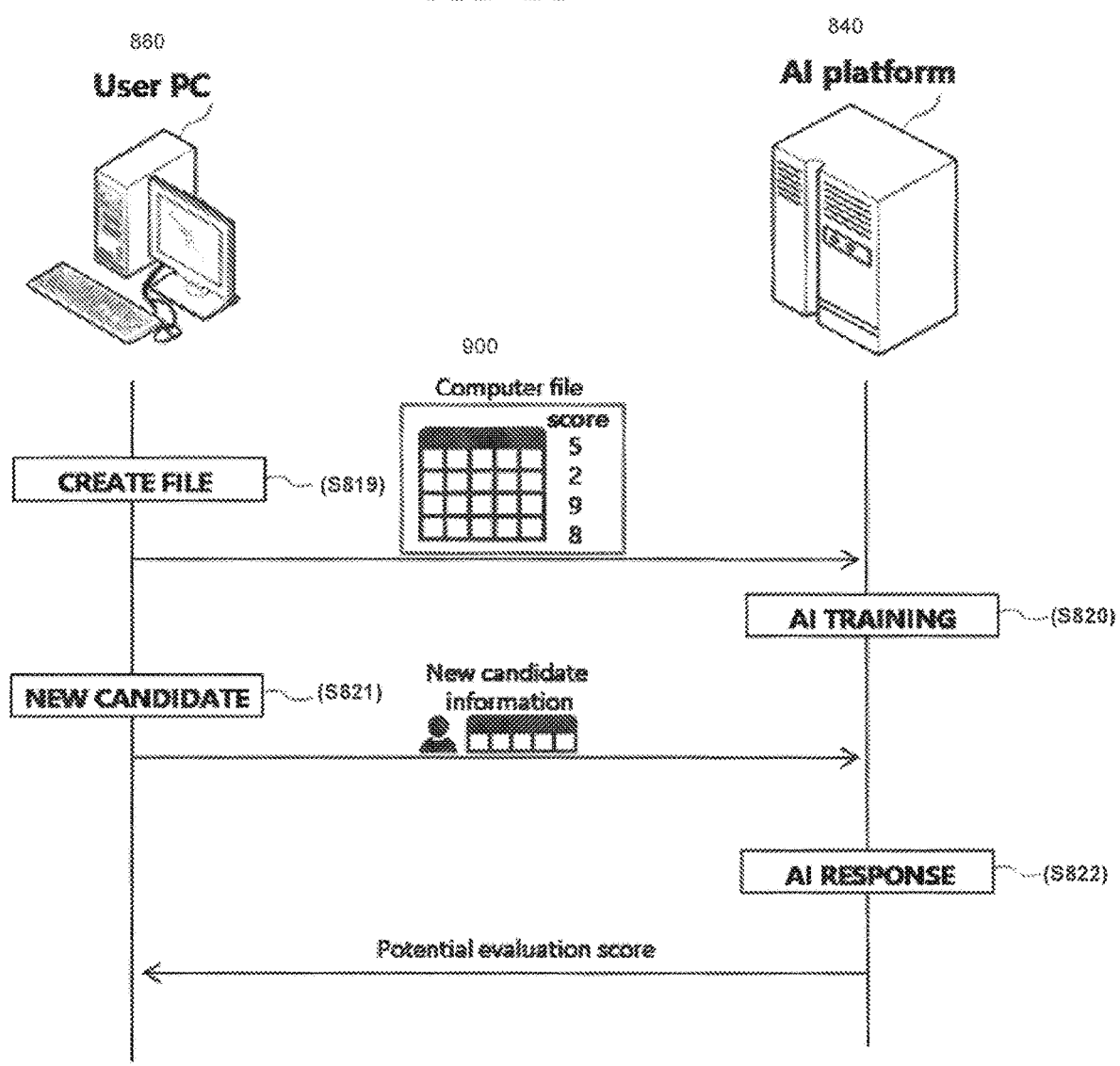
FIG. 10 is a drawing illustrating a use case of the platform with a HR (Human Resource) recruiting evaluation system according to embodiments of the present disclosure.

FIG. 10 is a drawing illustrating a use case of the platform with a HR (Human Resource) recruiting evaluation system. Here, the user may prepare a computer file containing a table of detail information of employees paired with each person's performance evaluation score.

In FIG. 10, the user PC 880 may serve as both the first electric device 100 and the second electric device 300.

In FIG. 10, the computer file 900 may serve as an input and the evaluation score of a candidate employee may serve as an output.

The user in the HR department of a company may collect current employee information and create the computer file 900 (S819). Examples of employee information may contain education, work history, career length, certifications, commute distance, and so on. Each employee data may be paired with an employee evaluation score.

The AI platform 840 may train an AI model using employee data as an input and evaluation score as an output (S820).

In recruiting, the user may send new candidate information to the AI platform 840 (S821).

The AI platform 840 may perform AI algorithm and return expected employee evaluation score of a potential candidate (S822).

Figure 11:
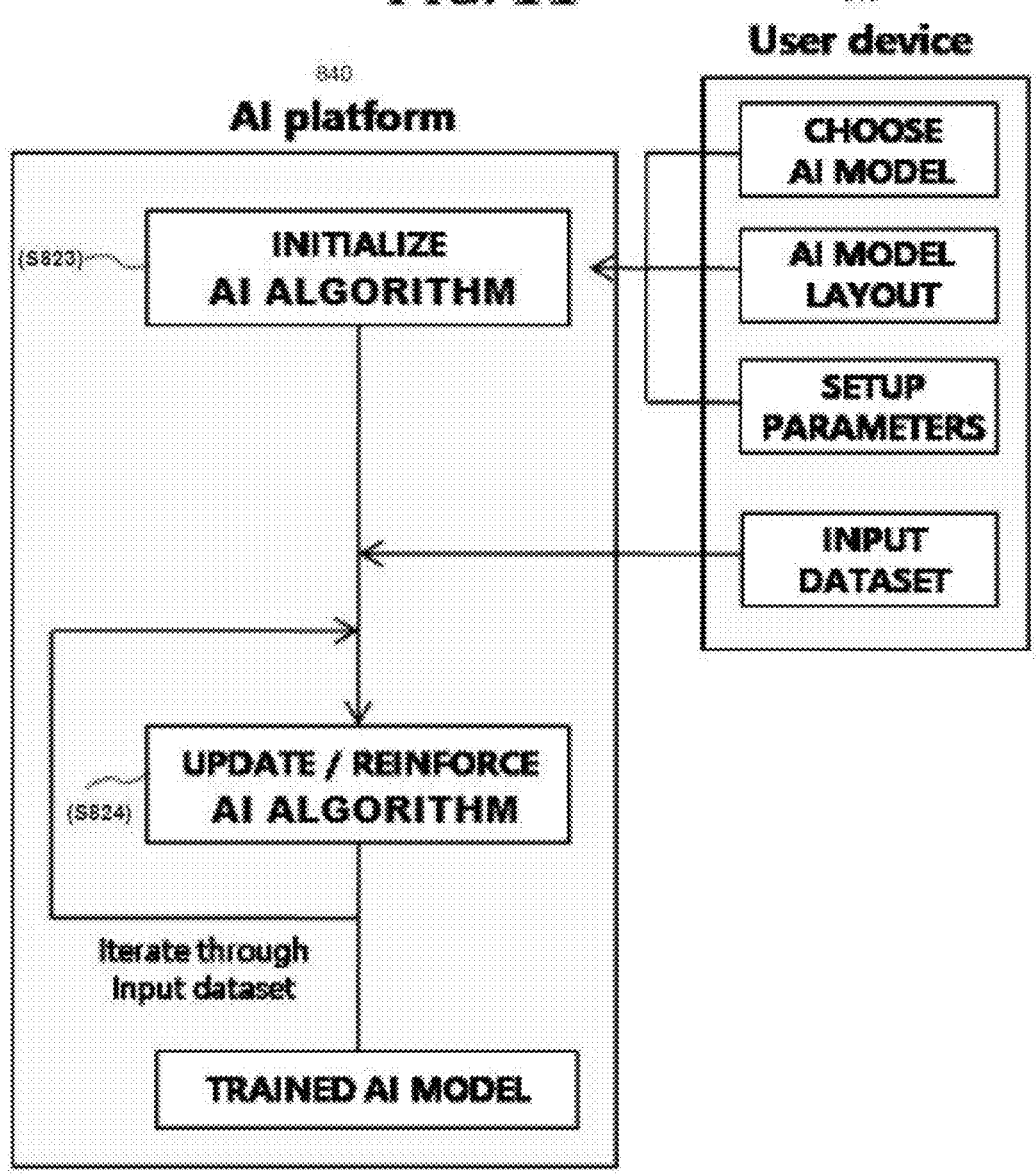
FIG. 11 is a drawing illustrating a use case of the platform in training a Neural Network based AI algorithms according to embodiments of the present disclosure.

FIG. 11 is a drawing illustrating a use case of the platform in training an AI algorithm.

The AI platform 840 may receive necessary information for initializing the AI algorithm (S823).

The AI platform 840 may receive an input dataset from a user device 910. AI training is performed by iterating through the input dataset and updating weights of AI algorithm connections. Each input data instance may reinforce the behavior of the AI algorithm response (S824).

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

According to various embodiments of the present disclosure, an electronic device, a service providing server, and a system providing a user-participating-type AI training service may provide the user with items of a subject for an AI training, an AI algorithm, a type of input data for the AI training, and a plurality of behavior patterns through a predetermined UI (User Interface) so that the user can easily select each of the items. An initial setting for the AI training may be set from the selection and the user may simply execute the AI training for the subject. Various embodiments of the present disclosure may make the user who is not an expert to execute the AI training and get an AI model of the user's chosen form. The user may embody behavior patterns of a robot by interlocking the AI model with the robot.

Various embodiments of the present disclosure may be embodied in a storage medium which includes instruction codes which are executable by a computer, such as a program module which is executable by the computer. A computer readable medium may be any usable medium which can be accessed by the computer and include all volatile and/or non-volatile and removable and/or non-removable media. Further, the computer readable medium may include any or all computer storage and communication media. The computer storage medium may include any or all volatile/non-volatile and removable/non-removable media embodied by a certain method or technology for storing information such as, for example, computer readable instruction code, a data structure, a program module, or other data. The communication medium may include the computer readable instruction code, the data structure, the program module, or other data of a modulated data signal such as a carrier wave, or other transmission mechanism, and includes information transmission mediums.

The above description of various embodiments of the present disclosure may be provided for the purpose of illustration, and it will be understood by those skilled in the art that various changes and modifications may be easily made without changing a technical conception and/or any essential features of the various embodiments. Thus, above-described various embodiments may be examples in all aspects, and do not limit the present disclosure. For example, each component described to be of a single type can be implemented in a distributed manner. Likewise, components described to be distributed can be implemented in a combined manner.

The scope of the present disclosure may be defined by the following claims, and it shall be understood that all modifications and embodiments conceived from the meaning and scope of the following claims and their equivalents are included in the scope of the present disclosure.

What is claimed is:

1. A system, comprising:
   one or more processors;
   one or more memories in communication with the one or more processors; and
   one or more programs, wherein the one or more programs are stored in the one or more memories to be executed by the one or more processors, the one or more programs including instructions for:

causing first data to be sent, over at least one network to a user device, to display, at the user device, at least one first user interface element for utilization in receiving first user input including an indication of a selection of at least one aspect of a subject system that is to receive a result of a training of a computer-implemented artificial intelligence;

after the first data is sent, receiving, from the user device over the at least one network, the first user input including the indication of the selection of the at least one aspect of the subject system that is to access the result of the training of the computer-implemented artificial intelligence, based on the utilization of the at least one first user interface element in receiving the first user input including the indication of the selection of the at least one aspect of the subject system that is to access the result of the training of the computer-implemented artificial intelligence;

causing second data to be sent, over the at least one network to the user device, to display, at the user device, at least one second user interface element for: indicating a plurality of artificial intelligence algorithms that are capable of being utilized to train the computer-implemented artificial intelligence, and utilization in receiving second user input including an indication of a selection of at least one artificial intelligence algorithm of the plurality of artificial intelligence algorithms that is to be utilized to train the computer-implemented artificial intelligence;

after the second data is sent, receiving, from the user device over the at least one network, the second user input including the indication of the selection of the at least one artificial intelligence algorithm of the plurality of artificial intelligence algorithms that is to be utilized to train the computer-implemented artificial intelligence, based on the utilization of the at least one second user interface element in receiving the second user input including the indication of the selection of the at least one artificial intelligence algorithm of the plurality of artificial intelligence algorithms that is to be utilized to train the computer-implemented artificial intelligence;

causing third data to be sent, over the at least one network to the user device, to display, at the user device, at least one third user interface element for: indicating a plurality of artificial intelligence algorithm settings that are capable of being utilized in controlling different aspects of the at least one artificial intelligence algorithm to train the computer-implemented artificial intelligence, and utilization in receiving third user input including an indication of a selection of at least one artificial intelligence algorithm setting of the plurality of artificial intelligence algorithm settings that is to be utilized to control at least one aspect of the different aspects of the at least one artificial intelligence algorithm to train the computer-implemented artificial intelligence, the at least one aspect of the different aspects of the at least one artificial intelligence algorithm including at least one of: a number of layers of the at least one artificial intelligence algorithm, a node of the at least one artificial intelligence algorithm, a function of the at least one artificial intelligence algorithm, or an amount of training of the at least one artificial intelligence algorithm;

after the third data is sent, receiving, from the user device over the at least one network, the third user input including the indication of the selection of the at least one artificial intelligence algorithm setting of the plurality of artificial intelligence algorithm settings that is to be utilized to control the at least one aspect of the different aspects of the at least one artificial intelligence algorithm to train the computer-implemented artificial intelligence, based on the utilization of the at least one third user interface element in receiving the third user input including the indication of the selection of the at least one artificial intelligence algorithm setting of the plurality of artificial intelligence algorithm settings that is to be utilized to control the at least one aspect of the different aspects of the at least one artificial intelligence algorithm to train the computer-implemented artificial intelligence;

causing fourth data to be sent, over the at least one network to the user device, to display, at the user device, at least one fourth user interface element for: indicating a plurality of different data types of one or more training input datasets that are capable of being utilized by the at least one artificial intelligence algorithm in accordance with the at least one artificial intelligence algorithm setting to train the computer-implemented artificial intelligence, and utilization in receiving fourth user input including an indication of a selection of at least one data type of the plurality of different data types of one or more training input datasets that is to be utilized by the at least one artificial intelligence algorithm in accordance with the at least one artificial intelligence algorithm setting to train the computer-implemented artificial intelligence, the indicated plurality of different data types of one or more training input datasets including a text data type and an image data type;

after the fourth data is sent, receiving, from the user device over the at least one network, the fourth user input including the indication of the selection of the at least one data type of the plurality of different data types of one or more training input datasets that is to be utilized by the at least one artificial intelligence algorithm in accordance with the at least one artificial intelligence algorithm setting to train the computer-implemented artificial intelligence, based on the utilization of the at least one fourth user interface element in receiving the fourth user input including the indication of the selection of the at least one data type of the plurality of different data types of one or more training input datasets that is to be utilized by the at least one artificial intelligence algorithm in accordance with the at least one artificial intelligence algorithm setting to train the computer-implemented artificial intelligence;

causing fifth data to be sent, over the at least one network to the user device, to display, at the user device, at least one fifth user interface element for utilization in receiving fifth user input including indication of a selection of at least one behavior that is to be utilized by the at least one artificial intelligence algorithm in accordance with the at least one artificial intelligence algorithm setting to train the computer-implemented artificial intelligence utilizing the at least one data type of one or more training input datasets;

after the fifth data is sent, receiving, from the user device over the at least one network, the fifth user input including the indication of the selection of the at least one behavior that is to be utilized by the at least one artificial intelligence algorithm in accordance with the at least one artificial intelligence algorithm setting to train the computer-implemented artificial intelligence utilizing the at least one data type of one or more training input datasets, based on the utilization of the at least one fifth user interface element in receiving the fifth user input including the indication of the selection of the at least one behavior that is to be utilized by the at least one artificial intelligence algorithm in accordance with the at least one artificial intelligence algorithm setting to train the computer-implemented artificial intelligence utilizing the at least one data type of one or more training input datasets;

receiving, from the user device over the at least one network, sixth user input to cause retrieval of information relating to the at least one artificial intelligence algorithm utilizing the at least one data type of one or more training input datasets and the at least one behavior in accordance with the at least one artificial intelligence algorithm setting to train the computer-implemented artificial intelligence, the information including at least one of: programming or coding data of the at least one artificial intelligence algorithm corresponding to the result of the training of the computer-implemented artificial intelligence, or training state data relating to a training state;

receiving, from the user device over the at least one network, seventh user input to cause the result of the training of the computer-implemented artificial intelligence to be accessible for utilization by the subject system;

causing storage of sixth data indicating: the at least one aspect of the subject system that is to access the result of the training of the computer-implemented artificial intelligence, the at least one artificial intelligence algorithm of the plurality of artificial intelligence algorithms that is to be utilized to train the computer-implemented artificial intelligence, the at least one artificial intelligence algorithm setting of the plurality of artificial intelligence algorithm settings that is to be utilized to control the at least one aspect of the different aspects of the at least one artificial intelligence algorithm to train the computer-implemented artificial intelligence, the at least one data type of the plurality of different data types of one or more training input datasets that is to be utilized by the at least one artificial intelligence algorithm in accordance with the at least one artificial intelligence algorithm setting to train the computer-implemented artificial intelligence, and the at least one behavior that is to be utilized by the at least one artificial intelligence algorithm in accordance with the at least one artificial intelligence algorithm setting to train the computer-implemented artificial intelligence utilizing the at least one data type of one or more training input datasets;

initializing the at least one artificial intelligence algorithm of the plurality of artificial intelligence algorithms that is to be utilized to train the computer-implemented artificial intelligence, based on the second user input; and at least one of updating or reinforcing the at least one artificial intelligence algorithm by iterating through the one or more training input datasets and updating one or more weights of the at least one artificial intelligence algorithm, based on the third user input including the indication of the selection of the at least one artificial intelligence algorithm setting of the plurality of artificial intelligence algorithm settings that is to be utilized to control the at least one aspect of the different aspects of the at least one artificial intelligence algorithm to train the computer-implemented artificial intelligence including the at least one of: the number of layers of the at least one artificial intelligence algorithm, the node of the at least one artificial intelligence algorithm, the function of the at least one artificial intelligence algorithm, or the amount of training of the at least one artificial intelligence algorithm, so as to avoid a requirement of user-generated computer-executable computer code being received by the system from the user device to control the at least one aspect of the different aspects of the at least one artificial intelligence algorithm to train the computer-implemented artificial intelligence including the at least one of: the number of layers of the at least one artificial intelligence algorithm, the node of the at least one artificial intelligence algorithm, the function of the at least one artificial intelligence algorithm, or the amount of training of the at least one artificial intelligence algorithm.

2. The system of claim 1, wherein the system is configured such that the at least one artificial intelligence algorithm is initialized without any computer code input by a user that inputs the first user input, the second user input, the third user input, the fourth user input, and the fifth user input.

3. The system of claim 1, wherein the system is configured such that the at least one artificial intelligence algorithm is initialized without a requirement of any code being received by the system from the user device.

4. The system of claim 1, wherein the system is configured such that, in response to the receipt of the seventh user input, the result of the training of the computer-implemented artificial intelligence is made accessible for utilization by the subject system.

5. The system of claim 4, wherein the system is configured such that the result of the training of the computer-implemented artificial intelligence is made accessible for utilization by the subject system, by the system sending the result directly to the subject system over one or more networks.

6. The system of claim 4, wherein the system is configured such that the result of the training of the computer-implemented artificial intelligence is made accessible for utilization by the subject system, by the system sending the result to the user device, for being manually sent from the user device to the subject system over one or more networks.

7. The system of claim 1, wherein the one or more programs include instructions for receiving a request from the user device for enabling additional input to be received from another user device, such that the training of the computer-implemented artificial intelligence is further based on the additional input.

8. The system of claim 1, wherein the one or more programs include instructions for receiving a request from the user device for enabling sharing with another user device that is administered by another user that is separate from a user of the user device.

9. The system of claim 8, wherein the system is configured such that the user and the another user are included in a group by the system.

10. The system of claim 9, wherein the system is configured such that each user in the group is capable chatting via a chat room administered by the system.

11. The system of claim 9, wherein the system is configured such that each user in the group is capable of receiving the information.

12. The system of claim 9, wherein the system is configured such that each user in the group is capable of receiving operation logs associated with the training of the computer-implemented artificial intelligence.

13. The system of claim 8, wherein the system is configured such that the user and the another user are grouped by the system.

14. The system of claim 8, wherein the system is configured such that the sixth user input is capable of being received from the another user device.

15. The system of claim 1, wherein the one or more programs include instructions for receiving an invitation user input requesting another user device to participate in the training of the computer-implemented artificial intelligence, wherein, in response to the invitation user input, data corresponding to the invitation user input is sent to the another device.

16. The system of claim 15, wherein the system is configured such that the invitation user input is based on a contact database.

17. The system of claim 15, wherein the system is configured such that the invitation user input is generated based on information received from an on-line contact database.

18. The system of claim 15, wherein the system is configured such that the invitation user input is generated based on information received from a contact database stored on the user device.

19. The system of claim 15, wherein the system is configured such that the data corresponding to the invitation user input is sent from the user device to the another device without being sent via the system.

20. The system of claim 15, wherein the system is configured such that the data corresponding to the invitation user input is sent via the system.

21. The system of claim 1, wherein the one or more programs include instructions for receiving an invitation user input requesting another user device to participate in the training of the computer-implemented artificial intelligence, wherein, in response to the invitation user input, data corresponding to the invitation user input is sent to the another device, the another user device being administered by another user that is separate from a user of the user device.

22. The system of claim 21, wherein the system is configured such that the data corresponding to the invitation user input is sent from the user device to the another device without being sent via the system.

23. The system of claim 21, wherein the system is configured such that the data corresponding to the invitation user input is sent via the system.

24. The system of claim 1, wherein the one or more programs include instructions for receiving an invitation user input requesting another user device to participate in the training of the computer-implemented artificial intelligence by inputting at least one aspect of the at least one behavior that is to be utilized by the at least one artificial intelligence algorithm, wherein, in response to the invitation user input, data corresponding to the invitation user input is sent to the another device, the another user device being administered by another user that is separate from a user of the user device.

25. The system of claim 24, wherein the system is configured such that the data corresponding to the invitation user input is sent from the user device to the another device without being sent via the system.

26. The system of claim 24, wherein the system is configured such that the data corresponding to the invitation user input is sent via the system.

27. The system of claim 1, wherein the system is configured such that the first data, the second data, the third data, the fourth data, and the fifth data, are sent separately over the at least one network.

28. The system of claim 1, wherein the system is configured such that at least two of: the first data, the second data, the third data, the fourth data, and the fifth data are sent separately over the at least one network.

29. The system of claim 1, wherein the system is configured such that at least three of: the first data, the second data, the third data, the fourth data, and the fifth data, are sent separately over the at least one network.

30. The system of claim 1, wherein the system is configured such that at least four of: the first data, the second data, the third data, the fourth data, and the fifth data, are sent separately over the at least one network.

31. The system of claim 1, wherein the system is configured such that the first data, the second data, the third data, the fourth data, and the fifth data are sent together over the at least one network.

32. The system of claim 1, wherein the system is configured such that at least two of: the first data, the second data, the third data, the fourth data, and the fifth data are sent together.

33. The system of claim 1, wherein the system is configured such that at least three of: the first data, the second data, the third data, the fourth data, and the fifth data, are sent together over the at least one network.

34. The system of claim 1, wherein the system is configured such that at least four of: the first data, the second data, the third data, the fourth data, and the fifth data, are sent together over the at least one network.

35. The system of claim 1, wherein the system is configured such that the at least one first user interface element is caused to be displayed without being displayed together with the at least one second user interface element, the at least one third user interface element, the at least one fourth user interface element, nor the at least one fifth user interface element.

36. The system of claim 1, wherein the system is configured such that the at least one second user interface element is caused to be displayed without being displayed together with the at least one first user interface element, the at least one third user interface element, the at least one fourth user interface element, nor the at least one fifth user interface element.

37. The system of claim 1, wherein the system is configured such that the at least one third user interface element is caused to be displayed without being displayed together with the at least one first user interface element, the at least one second user interface element, the at least one fourth user interface element, nor the at least one fifth user interface element.

38. The system of claim 1, wherein the system is configured such that the at least one fourth user interface element is caused to be displayed without being displayed together with the at least one first user interface element, the at least one second user interface element, the at least one third user interface element, nor the at least one fifth user interface element.

39. The system of claim 1, wherein the system is configured such that the at least one fifth user interface element is caused to be displayed without being displayed together with the at least one first user interface element the at least one second user interface element, the at least one third user interface element, nor the at least one fourth user interface element.

40. The system of claim 1, wherein the system is configured such that the at least one first user interface element, the at least one second user interface element, the at least one third user interface element, the at least one fourth user interface element, and the at least one fifth user interface element are displayed each displayed via separate user interface screens.

41. The system of claim 1, wherein the system is configured such that the at least one first user interface element, the at least one second user interface element, the at least one third user interface element, the at least one fourth user interface element, and the at least one fifth user interface element are displayed each displayed via respective user interfaces.

42. The system of claim 1, wherein the system is configured such that the at least one first user interface element is caused to be displayed together with the at least one second user interface element, the at least one third user interface element, the at least one fourth user interface element, and the at least one fifth user interface element.

43. The system of claim 1, wherein the system is configured such that the at least one first user interface element is caused to be displayed together with the at least one fourth user interface element.

44. The system of claim 1, wherein the system is configured such that the at least one first user interface element is caused to be displayed together with the at least one fifth user interface element.

45. The system of claim 1, wherein the system is configured such that the at least one fourth user interface element is caused to be displayed together with the at least one fifth user interface element.

46. The system of claim 1, wherein the system is configured such that the at least one first user interface element is caused to be displayed together with the at least one fourth user interface element and the at least one fifth user interface element.

47. The system of claim 1, wherein the system is configured such that the at least one second user interface element is caused to be displayed together with the at least one third user interface element.

48. The system of claim 1, wherein the system is configured to cause initial setting data to be sent, over the at least one network to the user device, the initial setting data being based on the first user input.

49. The system of claim 1, wherein the system is configured to cause initial setting data to be sent, over the at least one network to the user device, the initial setting data being based on the second user input.

50. The system of claim 1, wherein the system is configured to cause initial setting data to be sent, over the at least one network to the user device, the initial setting data being based on the third user input.

51. The system of claim 1, wherein the system is configured to cause initial setting data to be sent, over the at least one network to the user device, the initial setting data being based on the fourth user input.

52. The system of claim 1, wherein the system is configured to cause initial setting data to be sent, over the at least one network to the user device, the initial setting data being based on the fifth user input.

53. The system of claim 1, wherein the system is configured to cause initial setting data to be sent, over the at least one network to the user device, the initial setting data being based on at least two of: the first user input, the second user input, the third user input, the fourth user input, and the fifth user input.

54. The system of claim 1, wherein the system is configured to cause initial setting data to be sent, over the at least one network to the user device, the initial setting data being based on at least three of: the first user input, the second user input, the third user input, the fourth user input, and the fifth user input.

55. The system of claim 1, wherein the system is configured to cause initial setting data to be sent, over the at least one network to the user device, the initial setting data being based on at least four of: the first user input, the second user input, the third user input, the fourth user input, and the fifth user input.

56. The system of claim 1, wherein the system is configured to cause initial setting data to be sent, over the at least one network to the user device, the initial setting data being based on the first user input, the second user input, the third user input, the fourth user input, and the fifth user input.

57. The system of claim 1, wherein the system is configured such that the first user input is required to be received before the second user input, the third user input, and the fourth user input is received.

58. The system of claim 1, wherein the system is configured such that the first user input is capable of being received before the second user input, the third user input, and the fourth user input is received.

59. The system of claim 1, wherein the system is configured such that the first user input is required to be received before the second user input, and the third user input.

60. The system of claim 1, wherein the system is configured such that the first user input is capable of being received before the second user input, and the third user input.

61. The system of claim 1, wherein the system is configured such that the fifth user input is capable of being received before the second user input, the third user input, and the fourth user input is received.

62. The system of claim 1, wherein fifth system is configured such that the first user input is required to be received before the second user input, and the third user input.

63. The system of claim 1, wherein the system is configured such that the fifth user input is capable of being received before the second user input, and the third user input.

64. The system of claim 1, wherein the system is configured such that the fourth user input is required to be received before the second user input, the third user input, and the first user input is received.

65. The system of claim 1, wherein the system is configured such that the fourth user input is capable of being received before the second user input, the third user input, and the first user input is received.

66. The system of claim 1, wherein the system is configured such that the fourth user input is required to be received before the second user input, the third user input, and the fifth user input is received.

67. The system of claim 1, wherein the system is configured such that the fourth user input is capable of being received before the second user input, the third user input, and the fifth user input is received.

68. The system of claim 1, wherein system is configured such that the fourth user input is required to be received before the second user input, and the third user input.

69. The system of claim 1, wherein the system is configured such that the fourth user input is capable of being received before the second user input, and the third user input.

70. The system of claim 1, wherein the system is configured such that the second user input is required to be received before the third user input and the fourth user input is received.

71. The system of claim 1, wherein the system is configured such that the second user input is capable of being received before the third user input and the fourth user input is received.

72. The system of claim 1, wherein the system is configured such that the at least one fifth user interface element indicates a plurality of different behaviors that are capable of being utilized by the at least one artificial intelligence algorithm in accordance with the at least one artificial intelligence algorithm setting to train the computer-implemented artificial intelligence, such that the indication of the selection of the at least one behavior is received based on the utilization of the at least one first user interface element in receiving the indication of the selection of the at least one behavior from the indicated plurality of different behaviors.

73. The system of claim 72, wherein the system is configured such that the plurality of different behaviors that are indicated, is a based on the first user input including the indication of the selection of the at least one aspect of the subject system.

74. The system of claim 72, wherein the system is configured such that the plurality of different behaviors that are indicated, is a based on the first user input including the indication of the selection of the at least one aspect of the subject system, such that a different one or more of the plurality of different behaviors is indicated based on the first user input including the indication of the selection of the at least one aspect of the subject system.

75. The system of claim 72, wherein the system is configured such that the plurality of behaviors, includes a plurality of predetermined behaviors.

76. The system of claim 72, wherein the system is configured such that the plurality of behaviors, includes a plurality of predetermined behaviors of different types.

77. The system of claim 75, wherein the system is configured such that the plurality of predetermined behaviors are capable of being updated.

78. The system of claim 75, wherein the system is configured such that the plurality of behaviors, includes at least one additional behavior that is input by a user of the user device.

79. The system of claim 75, wherein the system is configured such that the plurality of behaviors, includes at least one additional behavior that is input by another user device, the another user device being administered by another user that is separate from a user of the user device.

80. The system of claim 75, wherein the system is configured such that the plurality of behaviors, includes at least one additional behavior that is input by another user device and is indicated to be a recommended behavior.

81. The system of claim 75, wherein the system is configured such that the plurality of behaviors, includes at least one additional behavior that is included based on at least one aspect of a user account associated with the user device.

82. The system of claim 72, wherein the system is configured such that the plurality of behaviors, includes at least one behavior that is input by a user of the user device.

83. The system of claim 72, wherein the system is configured such that the plurality of behaviors, includes at least one behavior that is input by another user device, the another user device being administered by another user that is separate from a user of the user device.

84. The system of claim 1, wherein the system is configured such that the at least one artificial intelligence algorithm is capable of being initialized after only two of the first user input, the second user input, the third user input, the fourth user input, and the fifth user input, have been received.

85. The system of claim 1, wherein the system is configured such that the at least one artificial intelligence algorithm is capable of being initialized after only three of the first user input, the second user input, the third user input, the fourth user input, and the fifth user input, have been received.

86. The system of claim 1, wherein the system is configured such that the at least one artificial intelligence algorithm is capable of being initialized after only four of the first user input, the second user input, the third user input, the fourth user input, and the fifth user input, have been received.

87. The system of claim 1, wherein the system is configured such that the sixth user input is capable of being received after only two of the first user input, the second user input, the third user input, the fourth user input, and the fifth user input, have been received.

88. The system of claim 1, wherein the system is configured such that the sixth user input is capable of being received after only three of the first user input, the second user input, the third user input, the fourth user input, and the fifth user input, have been received.

89. The system of claim 1, wherein the system is configured such that the sixth user input is capable of being received after only four of the first user input, the second user input, the third user input, the fourth user input, and the fifth user input, have been received.

90. The system of claim 1, wherein the system is configured such that the at least one aspect of the different aspects of the at least one artificial intelligence algorithm is set to a default value, in the event that the third user input is not received.

91. The system of claim 90, wherein the system is configured such that the at least one aspect of the different aspects of the at least one artificial intelligence algorithm includes the number of layers of the at least one artificial intelligence algorithm.

92. The system of claim 90, wherein the system is configured such that the at least one aspect of the different aspects of the at least one artificial intelligence algorithm includes the node of the at least one artificial intelligence algorithm.

93. The system of claim 90, wherein the system is configured such that the at least one aspect of the different aspects of the at least one artificial intelligence algorithm includes the function of the at least one artificial intelligence algorithm.

94. The system of claim 90, wherein the system is configured such that the at least one aspect of the different aspects of the at least one artificial intelligence algorithm includes the amount of training of the at least one artificial intelligence algorithm.

95. The system of claim 90, wherein the system is configured such that the at least one aspect of the different aspects of the at least one artificial intelligence algorithm includes a structure aspect.

96. The system of claim 90, wherein the system is configured such that the at least one aspect of the different aspects of the at least one artificial intelligence algorithm includes a parameter aspect.

97. The system of claim 90, wherein the system is configured such that the default value is based on the first user input.

98. The system of claim 90, wherein the system is configured such that the default value is based on the second user input.

99. The system of claim 90, wherein the system is configured such that the default value is based on the fourth user input.

100. The system of claim 90, wherein the system is configured such that the default value is based on the fifth user input.

101. The system of claim 90, wherein the system is configured such that the default value is based on at least two of the first user input, the second user input, the fourth user input, and the fifth user input.

102. The system of claim 90, wherein the system is configured such that the default value is based on at least three of the first user input, the second user input, the fourth user input, and the fifth user input.

103. The system of claim 1, wherein the system is configured such that the at least one aspect of the different aspects of the at least one artificial intelligence algorithm is set to a default value, in the event that the third user input indicates authorization for the system to set the same.

104. The system of claim 103, wherein the system is configured such that the at least one aspect of the different aspects of the at least one artificial intelligence algorithm includes the number of layers of the at least one artificial intelligence algorithm.

105. The system of claim 103, wherein the system is configured such that the at least one aspect of the different aspects of the at least one artificial intelligence algorithm includes the node of the at least one artificial intelligence algorithm.

106. The system of claim 103, wherein the system is configured such that the at least one aspect of the different aspects of the at least one artificial intelligence algorithm includes the function of the at least one artificial intelligence algorithm.

107. The system of claim 103, wherein the system is configured such that the at least one aspect of the different aspects of the at least one artificial intelligence algorithm includes the amount of training of the at least one artificial intelligence algorithm.

108. The system of claim 103, wherein the system is configured such that the at least one aspect of the different aspects of the at least one artificial intelligence algorithm includes a structure aspect.

109. The system of claim 103, wherein the system is configured such that the at least one aspect of the different aspects of the at least one artificial intelligence algorithm includes a parameter aspect.

110. The system of claim 103, wherein the system is configured such that the default value is based on the first user input.

111. The system of claim 103, wherein the system is configured such that the default value is based on the second user input.

112. The system of claim 103, wherein the system is configured such that the default value is based on the fourth user input.

113. The system of claim 103, wherein the system is configured such that the default value is based on the fifth user input.

114. The system of claim 103, wherein the system is configured such that the default value is based on at least two of the first user input, the second user input, the fourth user input, and the fifth user input.

115. The system of claim 103, wherein the system is configured such that the default value is based on at least three of the first user input, the second user input, the fourth user input, and the fifth user input.

116. The system of claim 1, wherein the system is configured such that the at least one aspect of the different aspects of the at least one artificial intelligence algorithm is set to a default value, based on the first user input including the indication of the selection of the at least one aspect of the subject system that is to access the result of the training of the computer-implemented artificial intelligence.

117. The system of claim 116, wherein the system is configured such that the at least one aspect of the different aspects of the at least one artificial intelligence algorithm includes the number of layers of the at least one artificial intelligence algorithm.

118. The system of claim 116, wherein the system is configured such that the at least one aspect of the different aspects of the at least one artificial intelligence algorithm includes the node of the at least one artificial intelligence algorithm.

119. The system of claim 116, wherein the system is configured such that the at least one aspect of the different aspects of the at least one artificial intelligence algorithm includes the function of the at least one artificial intelligence algorithm.

120. The system of claim 116, wherein the system is configured such that the at least one aspect of the different aspects of the at least one artificial intelligence algorithm includes the amount of training of the at least one artificial intelligence algorithm.

121. The system of claim 116, wherein the system is configured such that the at least one aspect of the different aspects of the at least one artificial intelligence algorithm includes a structure aspect.

122. The system of claim 116, wherein the system is configured such that the at least one aspect of the different aspects of the at least one artificial intelligence algorithm includes a parameter aspect.

123. The system of claim 1, wherein the system is configured such that the at least one aspect of the different aspects of the at least one artificial intelligence algorithm is set to a default value, based on the second user input including the indication of the selection of the at least one artificial intelligence algorithm of the plurality of artificial intelligence algorithms that is to be utilized to train the computer-implemented artificial intelligence.

124. The system of claim 123, wherein the system is configured such that the at least one aspect of the different aspects of the at least one artificial intelligence algorithm includes the number of layers of the at least one artificial intelligence algorithm.

125. The system of claim 123, wherein the system is configured such that the at least one aspect of the different aspects of the at least one artificial intelligence algorithm includes the node of the at least one artificial intelligence algorithm.

126. The system of claim 123, wherein the system is configured such that the at least one aspect of the different aspects of the at least one artificial intelligence algorithm includes the function of the at least one artificial intelligence algorithm.

127. The system of claim 123, wherein the system is configured such that the at least one aspect of the different aspects of the at least one artificial intelligence algorithm includes the amount of training of the at least one artificial intelligence algorithm.

128. The system of claim 123, wherein the system is configured such that the at least one aspect of the different aspects of the at least one artificial intelligence algorithm includes a structure aspect.

129. The system of claim 123, wherein the system is configured such that the at least one aspect of the different aspects of the at least one artificial intelligence algorithm includes a parameter aspect.

130. The system of claim 1, wherein the system is configured such that the at least one aspect of the different aspects of the at least one artificial intelligence algorithm is set to a default value, based on the fourth user input including the indication of the selection of the at least one data type of one or more training input datasets that is to be utilized by the at least one artificial intelligence algorithm in accordance with the at least one artificial intelligence algorithm setting to train the computer-implemented artificial intelligence.

131. The system of claim 130, wherein the system is configured such that the at least one aspect of the different aspects of the at least one artificial intelligence algorithm includes the number of layers of the at least one artificial intelligence algorithm.

132. The system of claim 130, wherein the system is configured such that the at least one aspect of the different aspects of the at least one artificial intelligence algorithm includes the node of the at least one artificial intelligence algorithm.

133. The system of claim 130, wherein the system is configured such that the at least one aspect of the different aspects of the at least one artificial intelligence algorithm includes the function of the at least one artificial intelligence algorithm.

134. The system of claim 130, wherein the system is configured such that the at least one aspect of the different aspects of the at least one artificial intelligence algorithm includes the amount of training of the at least one artificial intelligence algorithm.

135. The system of claim 130, wherein the system is configured such that the at least one aspect of the different aspects of the at least one artificial intelligence algorithm includes a structure aspect.

136. The system of claim 130, wherein the system is configured such that the at least one aspect of the different aspects of the at least one artificial intelligence algorithm includes a parameter aspect.

137. The system of claim 1, wherein the system is configured such that the at least one aspect of the different aspects of the at least one artificial intelligence algorithm is set to a default value, based on the fifth user input including the indication of the selection of the at least one behavior that is to be utilized by the at least one artificial intelligence algorithm in accordance with the at least one artificial intelligence algorithm setting to train the computer-implemented artificial intelligence utilizing the at least one data type of one or more training input datasets.

138. The system of claim 137, wherein the system is configured such that the at least one aspect of the different aspects of the at least one artificial intelligence algorithm includes the number of layers of the at least one artificial intelligence algorithm.

139. The system of claim 137, wherein the system is configured such that the at least one aspect of the different aspects of the at least one artificial intelligence algorithm includes the node of the at least one artificial intelligence algorithm.

140. The system of claim 137, wherein the system is configured such that the at least one aspect of the different aspects of the at least one artificial intelligence algorithm includes the function of the at least one artificial intelligence algorithm.

141. The system of claim 137, wherein the system is configured such that the at least one aspect of the different aspects of the at least one artificial intelligence algorithm includes the amount of training of the at least one artificial intelligence algorithm.

142. The system of claim 137, wherein the system is configured such that the at least one aspect of the different aspects of the at least one artificial intelligence algorithm includes a structure aspect.

143. The system of claim 137, wherein the system is configured such that the at least one aspect of the different aspects of the at least one artificial intelligence algorithm includes a parameter aspect.

144. The system of claim 1, wherein the system is configured such that the subject system includes at least one server that is separate from the system.

145. The system of claim 1, wherein the system is configured such that the at least one first user interface element indicates a plurality of subject systems that are capable of accessing the result of the training of the computer-implemented artificial intelligence, such that the indication of the selection of the at least one aspect of the subject system is received based on the utilization of the at least one first user interface element in receiving the indication of the selection of the at least one aspect of the subject system from the indicated plurality of subject systems.

146. The system of claim 145, wherein the system is configured such that the plurality of subject systems includes subject systems of different types.

147. The system of claim 145, wherein the system is configured such that the plurality of subject systems includes different parts of at least one single subject system.

148. The system of claim 1, wherein the system is configured such that the at least one behavior that is to be utilized by the at least one artificial intelligence algorithm, includes at least one predetermined behavior.

149. The system of claim 1, wherein the system is configured such that the at least one behavior that is to be utilized by the at least one artificial intelligence algorithm, includes at least one behavior that is input by a user of the user device.

150. The system of claim 1, wherein the system is configured such that the at least one behavior that is to be utilized by the at least one artificial intelligence algorithm, includes at least one behavior that is input by another user device, the another user device being administered by another user that is separate from a user of the user device.

151. The system of claim 1, wherein the system is configured such that the at least one aspect of the different aspects of the at least one artificial intelligence algorithm includes the number of layers of the at least one artificial intelligence algorithm.

152. The system of claim 1, wherein the system is configured such that the at least one aspect of the different aspects of the at least one artificial intelligence algorithm includes the node of the at least one artificial intelligence algorithm.

153. The system of claim 1, wherein the system is configured such that the at least one aspect of the different aspects of the at least one artificial intelligence algorithm includes the node of the at least one artificial intelligence algorithm, which includes the node for a particular layer of the at least one artificial intelligence algorithm.

154. The system of claim 1, wherein the system is configured such that the at least one aspect of the different aspects of the at least one artificial intelligence algorithm includes the node of the at least one artificial intelligence algorithm, which includes a plurality of nodes for a plurality of layers of the at least one artificial intelligence algorithm.

155. The system of claim 1, wherein the system is configured such that the at least one aspect of the different aspects of the at least one artificial intelligence algorithm includes the node of the at least one artificial intelligence algorithm, where the at least one aspect of the different aspects of the at least one artificial intelligence algorithm includes an arrangement of the node.

156. The system of claim 1, wherein the system is configured such that the at least one aspect of the different aspects of the at least one artificial intelligence algorithm includes the node of the at least one artificial intelligence algorithm, where the at least one aspect of the different aspects of the at least one artificial intelligence algorithm includes a type of the node.

157. The system of claim 1, wherein the system is configured such that the at least one aspect of the different aspects of the at least one artificial intelligence algorithm includes the node of the at least one artificial intelligence algorithm, where the at least one aspect of the different aspects of the at least one artificial intelligence algorithm includes an arrangement of the node in addition to an identification of the node.

158. The system of claim 1, wherein the system is configured such that the at least one aspect of the different aspects of the at least one artificial intelligence algorithm includes the node of the at least one artificial intelligence algorithm, where the at least one aspect of the different aspects of the at least one artificial intelligence algorithm includes a structure of the node.

159. The system of claim 1, wherein the system is configured such that the at least one aspect of the different aspects of the at least one artificial intelligence algorithm includes a structure of the at least one artificial intelligence algorithm.

160. The system of claim 1, wherein the system is configured such that the at least one aspect of the different aspects of the at least one artificial intelligence algorithm includes the function of the at least one artificial intelligence algorithm.

161. The system of claim 1, wherein the system is configured such that the at least one aspect of the different aspects of the at least one artificial intelligence algorithm includes the amount of training of the at least one artificial intelligence algorithm.

162. The system of claim 1, wherein the system is configured such that the at least one aspect of the different aspects of the at least one artificial intelligence algorithm includes the node of the at least one artificial intelligence algorithm, and the function of the at least one artificial intelligence algorithm.

163. The system of claim 1, wherein the system is configured such that the at least one aspect of the different aspects of the at least one artificial intelligence algorithm includes the number of layers of the at least one artificial intelligence algorithm, the node of the at least one artificial intelligence algorithm, the function of the at least one artificial intelligence algorithm, and the amount of training of the at least one artificial intelligence algorithm.

164. The system of claim 1, wherein the system is configured such that the at least one of the updating or reinforcing the at least one artificial intelligence algorithm, includes the updating the at least one artificial intelligence algorithm.

165. The system of claim 1, wherein the system is configured such that the at least one of the updating or reinforcing the at least one artificial intelligence algorithm, includes the reinforcing the at least one artificial intelligence algorithm.

166. The system of claim 1, wherein the system is configured such that the at least one of the updating or reinforcing the at least one artificial intelligence algorithm, includes both the updating and the reinforcing of the at least one artificial intelligence algorithm.

167. The system of claim 1, wherein the system is configured such that the at least one aspect of the different aspects of the at least one artificial intelligence algorithm includes a parameter aspect.

168. The system of claim 1, wherein the system is configured such that the at least one aspect of the different aspects of the at least one artificial intelligence algorithm includes a structure aspect.

169. The system of claim 1, wherein the system is configured such that the information includes the programming or coding data of the at least one artificial intelligence algorithm corresponding to the result of the training of the computer-implemented artificial intelligence.

170. The system of claim 1, wherein the system is configured such that the information includes the programming or coding data of the at least one artificial intelligence algorithm corresponding to the result of the training of the computer-implemented artificial intelligence, where the programming or coding data of the at least one artificial intelligence algorithm is encrypted before being received at the user device.

171. The system of claim 170, wherein the system is configured such that the programming or coding data of the at least one artificial intelligence algorithm is conditionally accessible.

172. The system of claim 170, wherein the system is configured such that the programming or coding data of the at least one artificial intelligence algorithm is conditionally accessible based on an accuracy of the result of the training of the computer-implemented artificial intelligence.

173. The system of claim 170, wherein the system is configured such that the programming or coding data of the at least one artificial intelligence algorithm is conditionally accessible based on a reliability of the result of the training of the computer-implemented artificial intelligence.

174. The system of claim 1, wherein the system is configured such that the information includes the training state data relating to the training state where the training state data is encrypted before being received at the user device.

175. The system of claim 1, wherein the system is configured such that the information includes the training state data relating to the training state.

176. The system of claim 175, wherein the system is configured such that the training state data is based on an accuracy of the result of the training of the computer-implemented artificial intelligence.

177. The system of claim 175, wherein the system is configured such that the training state data is based on a reliability of the result of the training of the computer-implemented artificial intelligence.

178. The system of claim 175, wherein the system is configured such that the training state data is generated based on whether at least one aspect of the training has reached a predetermined threshold.

179. The system of claim 175, wherein the system is configured such that the at least one aspect of the training includes a number of the training.

180. The system of claim 1, wherein the system is configured such that the first user input is received, based on the utilization of the at least one first user interface element in receiving the first user input, by the first user input being received, in response to the utilization of the at least one first user interface element in receiving the first user input.

181. The system of claim 1, wherein the system is configured such that the second user input is received, based on the utilization of the at least one second user interface element in receiving the second user input, by the second user input being received, in response to the utilization of the at least one second user interface element in receiving the second user input.

182. The system of claim 1, wherein the system is configured such that the third user input is received, based on the utilization of the at least one third user interface element in receiving the third user input, by the third user input being received, in response to the utilization of the at least one third user interface element in receiving the third user input.

183. The system of claim 1, wherein the system is configured such that the fourth user input is received, based on the utilization of the at least one fourth user interface element in receiving the fourth user input, by the fourth user input being received, in response to the utilization of the at least one fourth user interface element in receiving the fourth user input.

184. The system of claim 1, wherein the system is configured such that the fifth user input is received, based on the utilization of the at least one fifth user interface element in receiving the fifth user input, by the fifth user input being received, in response to the utilization of the at least one fifth user interface element in receiving the fifth user input.

185. The system of claim 1, wherein the system is configured such that the information is available only via a user account.

186. The system of claim 185, wherein the system is configured such that the information includes the programming or coding data of the at least one artificial intelligence algorithm corresponding to the result of the training of the computer-implemented artificial intelligence.

187. The system of claim 185, wherein the system is configured such that the information includes the training state data relating to a training state.

188. The system of claim 1, wherein the system is configured such that the information is generated if at least one aspect of the training has reached a predetermined threshold.

189. The system of claim 188, wherein the system is configured such that the information includes the programming or coding data of the at least one artificial intelligence algorithm corresponding to the result of the training of the computer-implemented artificial intelligence.

190. The system of claim 188, wherein the system is configured such that the information includes the training state data relating to a training state.

191. The system of claim 1, wherein the system is configured such that the information is generated if at least one aspect of the training has reached a predetermined threshold.

192. The system of claim 191, wherein the system is configured such that the at least one aspect of the training includes a number of the training.

193. The system of claim 191, wherein the system is configured such that the information includes the programming or coding data of the at least one artificial intelligence algorithm corresponding to the result of the training of the computer-implemented artificial intelligence.

194. The system of claim 191, wherein the system is configured such that the information includes the training state data relating to a training state.

195. The system of claim 1, wherein the system is configured such that the information is generated and sent to the user device, if at least one aspect of the training has reached a predetermined threshold.

196. The system of claim 195, wherein the system is configured such that the information includes the programming or coding data of the at least one artificial intelligence algorithm corresponding to the result of the training of the computer-implemented artificial intelligence.

197. The system of claim 195, wherein the system is configured such that the information includes the training state data relating to a training state.

198. The system of claim 1, wherein the system is configured such that the one or more training input datasets are pre-processed for reducing a size thereof.

199. The system of claim 1, wherein the system is configured such that the one or more training input datasets are pre-processed for reducing a size thereof, before being received by the system.

200. The system of claim 1, wherein the system is configured such that the one or more training input datasets are pre-processed for reducing a size thereof, after being received by the system.

201. The system of claim 1, wherein the system is configured such that the one or more training input datasets are pre-processed for reducing a size thereof, by changing a first data type thereof, to a second data type.

202. The system of claim 1, wherein the system is configured such that the one or more training input datasets are pre-processed for reducing a size thereof, by compressing the same.

203. The system of claim 1, wherein the system is configured such that the one or more training input datasets are pre-processed for encrypting the same, before being received by the system.

204. The system of claim 1, wherein the system is configured such that at least one aspect of the one or more training input datasets is limited to a predetermined threshold.

205. The system of claim 204, wherein the system is configured such that the at least one aspect of the one or more training input datasets, includes a size of the one or more training input datasets.

206. The system of claim 204, wherein the system is configured such that the at least one aspect of the one or more training input datasets, includes a resolution of the one or more training input datasets.

207. The system of claim 204, wherein the system is configured such that the at least one aspect of the one or more training input datasets, includes a length of the one or more training input datasets.

208. The system of claim 1, wherein the system is configured such that at least one aspect of the one or more training input datasets is limited to a predetermined threshold, based on the at least one data type of one or more training input datasets that is to be utilized by the at least one artificial intelligence algorithm.

209. The system of claim 208, wherein the system is configured such that the at least one aspect of the one or more training input datasets, includes a size of the one or more training input datasets.

210. The system of claim 208, wherein the system is configured such that the at least one aspect of the one or more training input datasets, includes a resolution of the one or more training input datasets.

211. The system of claim 208, wherein the system is configured such that the at least one aspect of the one or more training input datasets, includes a length of the one or more training input datasets.

212. The system of claim 208, wherein the system is configured such that at least one aspect of the one or more training input datasets is limited to one of a plurality of different predetermined thresholds, based on the at least one data type of one or more training input datasets that is to be utilized by the at least one artificial intelligence algorithm.

213. The system of claim 208, wherein the system is configured such that at least one aspect of the one or more training input datasets is limited to one of a plurality of different predetermined thresholds, based on the at least one data type of one or more training input datasets that is to be utilized by the at least one artificial intelligence algorithm, the plurality of different predetermined thresholds each corresponding with a different one of the plurality of different data types of one or more training input datasets.

214. The system of claim 1, wherein the system is configured such that the at least one data type of one or more training input datasets that is to be utilized by the at least one artificial intelligence algorithm, is capable of including only a single data type for each training of the computer-implemented artificial intelligence.

215. The system of claim 1, wherein the system is configured such that the at least one data type of one or more training input datasets that is to be utilized by the at least one artificial intelligence algorithm, is capable of including only a single data type at a time.

216. The system of claim 1, wherein the system is configured such that the at least one data type of one or more training input datasets that is to be utilized by the at least one artificial intelligence algorithm, is capable of including a plurality of data types.

217. The system of claim 1, wherein the system is configured such that the at least one data type of one or more training input datasets that is to be utilized by the at least one artificial intelligence algorithm, is capable of including a plurality of data types for each training of the computer-implemented artificial intelligence.

218. The system of claim 1, wherein the system is configured such that the plurality of different data types of one or more training input datasets, indicated by the at least one fourth user interface element, further include a voice data type.

219. The system of claim 1, wherein the system is configured such that the plurality of different data types of one or more training input datasets, indicated by the at least one fourth user interface element, further include a sound data type.

220. The system of claim 1, wherein the system is configured such that the plurality of different data types of one or more training input datasets, indicated by the at least one fourth user interface element, further include another data type, other than the text data type and the image data type.

221. The system of claim 1, wherein the system is configured such that the plurality of different data types of one or more training input datasets, indicated by the at least one fourth user interface element, further include two other data types, other than the text data type and the image data type.

222. The system of claim 1, wherein the system is configured such that the text data type includes a natural language data type.

223. The system of claim 1, wherein the system is configured such that the text data type includes a non-numerical text data type.

224. The system of claim 1, wherein the system is configured such that the image data type includes a video data type.

225. The system of claim 1, wherein the system is configured such that the plurality of different data types of one or more training input datasets, indicated by the at least one fourth user interface element, further include a video data type.

226. The system of claim 1, wherein the system is configured such that the one or more training input datasets is received via a file.

227. The system of claim 1, wherein the system is configured such that the one or more training input datasets is received via a single file.

228. The system of claim 1, wherein the system is configured such that at least a portion of the one or more training input datasets is received via manual entry.

229. The system of claim 1, wherein the system is configured such that the at least one behavior includes a desired behavior to be exhibited by the subject system after accessing the result of the training of the computer-implemented artificial intelligence.

230. The system of claim 1, wherein the system is configured such that each of the first user input, the second user input, the third user input, the fourth user input, and the fifth user input, are each capable of being received multiple times.

231. The system of claim 1, wherein the system is configured such that a notification is caused to be sent to the user device, in response to a completion of the training of the computer-implemented artificial intelligence.

232. The system of claim 1, wherein the system is configured such that the amount of training involves iterations.

233. The system of claim 1, wherein the system is configured such that the amount of training includes a number of iterations.

234. The system of claim 1, wherein the system is configured such that the subject system includes a robot.

235. The system of claim 1, wherein the system is configured such that: the at least one artificial intelligence algorithm is capable of being initialized without any code being input to the system from an end user of the system.

236. The system of claim 1, wherein the system is configured such that the at least one behavior includes at least one behavior pattern.

237. The system of claim 1, wherein the system is configured such that the at least one behavior involves selecting a particular output based on a particular input.

238. The system of claim 1, wherein the system is configured such that the at least one behavior involves predicting a particular output based on a particular input.

239. The system of claim 1, wherein the system is configured such that the at least one aspect of the subject system includes the subject system itself.

240. The system of claim 1, wherein the system is configured such that the at least one aspect of the subject system includes a name of the subject system.

241. The system of claim 1, wherein the system is configured such that the at least one aspect of the subject system includes a type of the subject system.

242. The system of claim 1, wherein the system is configured such that the at least one aspect of the subject system relates to an accessibility by the subject system to the result.

243. The system of claim 1, wherein the system is configured such that the plurality of artificial intelligence algorithms each includes a neural network-based artificial intelligence algorithm that utilizes a computer-implemented neural network.

244. The system of claim 1, wherein the system is configured such that the plurality of artificial intelligence algorithms each includes a neural network-based artificial intelligence algorithm that utilizes a different computer-implemented neural network.

245. The system of claim 1, wherein the system is configured such that at least one of the plurality of artificial intelligence algorithms includes a neural network-based artificial intelligence algorithm that utilizes a computer-implemented neural network.

246. The system of claim 1, wherein the system is configured such that at least one of the plurality of artificial intelligence algorithms includes a neural network-based artificial intelligence algorithm that utilizes a computer-implemented non-neural network.

247. The system of claim 1, wherein the system is configured such that at least one of the plurality of artificial intelligence algorithms includes a support vector machine (SVM)-based artificial intelligence algorithm that utilizes a computer-implemented SVM.

248. The system of claim 1, wherein the system is configured such that only a single one of the plurality of artificial intelligence algorithms includes a neural network-based artificial intelligence algorithm that utilizes a computer-implemented neural network.

249. The system of claim 1, wherein the system is configured such that none of the plurality of artificial intelligence algorithms includes a neural network-based artificial intelligence algorithm that utilizes a computer-implemented neural network.

250. The system of claim 1, wherein the system is configured such that the system and the subject system are different components of the same overarching system.

251. The system of claim 1, wherein the system is configured such that the system and the subject system are not different components of the same overarching system.

252. The system of claim 1, wherein the system is configured such that the sixth user input is received after receiving the first user input, the second user input, the third user input, the fourth user input, and the fifth user input.

253. The system of claim 1, wherein the system is configured such that the at least one behavior that is to be utilized by the at least one artificial intelligence algorithm in accordance with the at least one artificial intelligence algorithm setting to train the computer-implemented artificial intelligence utilizing the at least one data type of one or more training input datasets, is set by default, in the event that the fifth user input is not received.

254. The system of claim 1, wherein the system is configured such that the at least one aspect of the subject system that is to access the result of the training of the computer-implemented artificial intelligence, is set by default, in the event that the first user input is not received.

255. The system of claim 1, wherein the system is configured such that the at least one artificial intelligence algorithm of the plurality of artificial intelligence algorithms that is to be utilized to train the computer-implemented artificial intelligence, is set by default, in the event that the second user input is not received.

256. The system of claim 1, wherein the system is configured such that the at least one artificial intelligence algorithm setting of the plurality of artificial intelligence algorithm settings that is to be utilized to control the at least one aspect of the different aspects of the at least one artificial intelligence algorithm to train the computer-implemented artificial intelligence, is set by default, in the event that the third user input is not received.

257. The system of claim 1, wherein the system is configured such that the at least one data type of the plurality of different data types of one or more training input datasets that is to be utilized by the at least one artificial intelligence algorithm in accordance with the at least one artificial intelligence algorithm setting to train the computer-implemented artificial intelligence, is set by default, in the event that the fourth user input is not received.

258. The system of claim 1, wherein at least one of:
the one or more processors includes a single processor;
the one or more processors includes a plurality of processors;
the one or more processors includes a plurality of processors that are distributed;
the one or more processors includes a plurality of processors that are not distributed;
the one or more memories includes a single memory;
the one or more memories includes a plurality of memories;
the one or more memories includes at least one non-volatile memory;
the one or more memories does not include non-volatile memory;
the one or more programs includes a single program;
the one or more programs includes a plurality of programs;
the one or more memories include at least one non-volatile memory;
the one or more memories include only non-volatile memory;
the one or more memories include at least one volatile memory;
the one or more memories include only volatile memory;
the one or more memories include non-volatile memory and volatile memory;
the one or more memories are in direct communication with the one or more processors;
the one or more memories are in indirect communication with the one or more processors;
the instructions include different instructions that separately cause the accessing and each instance of the causing;
the instructions include a same set of instructions that causes the accessing and each instance of the causing;
the instructions include hardwired instructions;
the instructions include firmware instructions;

the instructions include software instructions;
each instance of the causing are performed by hardware;
each instance of the causing are performed by software;
each instance of the v are caused by software and performed by hardware;
only a subset of each instance of the causing is performed by hardware;
only a subset of each instance of the causing is performed by software;
only a subset of each instance of the causing is caused by software and performed by hardware;
one or more of the instances of the causing includes a direct causation;
one or more of the instances of the causing includes an indirect causation;
the system is portable;
the system is not portable;
the subject system is portable;
the subject system is not portable;
the subject system includes one or more servers;
the user device is portable;
the user device is not portable;
the includes a single network;
the includes a plurality of networks;
the includes a plurality of networks of different types;
the at least one behavior involves prediction of at least one variable;
the at least one behavior involves a matching involving at least one variable;
the at least one behavior includes an output behavior;
the artificial intelligence includes a single computer-implemented artificial intelligence;
the artificial intelligence includes a plurality of artificial intelligences;
the artificial intelligence includes a plurality of artificial intelligences, where a same one or more of the plurality of artificial intelligences is utilized for each instance of the causing;
the artificial intelligence includes a plurality of artificial intelligences, where a different one or more of the plurality of artificial intelligences is utilized for each instance of the causing;
the artificial intelligence is implemented utilizing the system;
the artificial intelligence is implemented utilizing another system other than the system;
the artificial intelligence is implemented utilizing the one or more processors;
the artificial intelligence is implemented utilizing one or more other processors other than the one or more processors;
the artificial intelligence is implemented utilizing one or more other processors other than the one or more processors, such that the one or more processors causes operation of the artificial intelligence utilizing one or more other processors;
the indication of the selection of the at least one aspect of the subject system, includes a description of the subject system;
the indication of the selection of the at least one aspect of the subject system, identifies a selected subject system;
the indication of the selection of the at least one artificial intelligence algorithm, includes a description of the at least one artificial intelligence algorithm;
the indication of the selection of the at least one artificial intelligence algorithm, identifies a selected at least one artificial intelligence algorithm;
the indication of the selection of the at least one artificial intelligence algorithm setting, includes a description of the at least one artificial intelligence algorithm setting;
the indication of the selection of the at least one artificial intelligence algorithm setting, identifies a selected at least one artificial intelligence algorithm setting;
the indication of the selection of the at least one data type, includes a description of the at least one artificial intelligence algorithm setting;
the indication of the selection of the at least one data type, identifies a selected at least one artificial intelligence algorithm setting;
the first user input, the second user input, the third user input, the fourth user input, and the fifth user input each include a single user input;
the first user input, the second user input, the third user input, the fourth user input, and the fifth user input each include a set of multiple user input portions;
the first user input, the second user input, the third user input, the fourth user input, and the fifth user input each include a set of multiple user inputs;
the first user input, the second user input, the third user input, the fourth user input, and the fifth user input each include user input-related data;
the first user input, the second user input, the third user input, the fourth user input, and the fifth user input each include data that is based on the first user input, the second user input, the third user input, the fourth user input, and the fifth user input, respectively;
the first user input, the second user input, the third user input, the fourth user input, and the fifth user input each include actual user inputs;
the at least one first user interface element, the at least one second user interface element, the at least one third user interface element, the at least one fourth user interface element, and the at least one fifth user interface element, each include an element of a user interface;
the at least one first user interface element, the at least one second user interface element, the at least one third user interface element, the at least one fourth user interface element, and the at least one fifth user interface element, each include an element of a user interface that includes a portion of the user interface;
the at least one first user interface element, the at least one second user interface element, the at least one third user interface element, the at least one fourth user interface element, and the at least one fifth user interface element, each include at least one of text, a graphic, a symbol, or a portion of an interface;
the at least one first user interface element, the at least one second user interface element, the at least one third user interface element, the at least one fourth user interface element, and the at least one fifth user interface element, each include a corresponding single user interface element;
at least two of the at least one first user interface element, the at least one second user interface element, the at least one third user interface element, the at least one fourth user interface element, and the at least one fifth user interface element, each include a set of user interface elements;
the at least one first user interface element, the at least one second user interface element, the at least one third user interface element, the at least one fourth user interface element, and the at least one fifth user interface element, each include a set of user interface elements;

at least two of the at least one first user interface element, the at least one second user interface element, the at least one third user interface element, the at least one fourth user interface element, and the at least one fifth user interface element, are part of a single user interface;

the at least one first user interface element, the at least one second user interface element, the at least one third user interface element, the at least one fourth user interface element, and the at least one fifth user interface element, are part of a single user interface;

at least two of the at least one first user interface element, the at least one second user interface element, the at least one third user interface element, the at least one fourth user interface element, and the at least one fifth user interface element, are each part of separate user interfaces;

the at least one first user interface element, the at least one second user interface element, the at least one third user interface element, the at least one fourth user interface element, and the at least one fifth user interface element, are not part of a single user interface;

at least one of the at least one first user interface element, the at least one second user interface element, the at least one third user interface element, the at least one fourth user interface element, or the at least one fifth user interface element, is part of an initial settings user interface;

the at least one first user interface element is for utilization in receiving the first user input, by allowing a user to enter the first user input by selecting the at least one first user interface element;

the at least one first, second, third, fourth, and fifth user interface element is for utilization in receiving the first, second, third, fourth, and fifth user input, respectively, by allowing a user to enter the first, second, third, fourth, and fifth user input by selecting the at least one first, second, third, fourth, and fifth user interface element, respectively;

the at least one first user interface element is for utilization in receiving the first user input, by allowing a user to enter the first user input by entering a selection via the at least one first user interface element;

the at least one first, second, third, fourth, and fifth user interface element is for utilization in receiving the at least one first, second, third, fourth, and fifth user input, respectively, by allowing a user to enter the at least one first, second, third, fourth, and fifth user input by entering a selection via the at least one first, second, third, fourth, and at least one fifth user interface element, respectively;

the at least one first user interface element is for utilization in receiving the first user input, by allowing a user to enter the first user input by entering data via the at least one first user interface element;

the at least one first, second, third, fourth, and fifth user interface element is for utilization in receiving the first, second, third, fourth, and fifth user input, respectively, by allowing a user to enter the first, second, third, fourth, and fifth user input by entering data via the at least one first, second, third, fourth, and fifth user interface element, respectively;

at least two of the first, second, third, fourth, and fifth data are caused to be sent together;

the first, second, third, fourth, and fifth data are caused to be sent together;

the first, second, third, fourth, and fifth data are caused to be sent together in a single software package;

the first, second, third, fourth, and fifth data are caused to be sent separately;

at least two of the first, second, third, fourth, and fifth data are caused to be sent separately;

the result of the training of the computer-implemented artificial intelligence includes a final result;

the result of the training of the computer-implemented artificial intelligence includes an intermediate result;

the result of the training of the computer-implemented artificial intelligence includes the programming or coding data of the at least one artificial intelligence algorithm;

the result of the training of the computer-implemented artificial intelligence is accessible for utilization by the subject system, by the programming or coding data of the at least one artificial intelligence algorithm being sent to the subject system;

the result of the training of the computer-implemented artificial intelligence is accessible for utilization by the subject system, by the system being accessible to the subject system;

the result of the training of the computer-implemented artificial intelligence is accessible for utilization by the subject system, by the system allowing communication between the system and the subject system, so that the subject system is capable of accessing the result;

the result of the training of the computer-implemented artificial intelligence is accessible for utilization by the subject system, by the system allowing communication between the system and the subject system, so that the subject system is capable of accessing the programming or coding data of the at least one artificial intelligence algorithm;

the first data is caused to be sent first, and the first user input is received first;

the first data is not caused to be sent first, and the first user input is not received first;

the second data is caused to be sent second, and the second user input is received second;

the second data is not caused to be sent second, and the second user input is not received second;

the third data is caused to be sent third, and the third user input is received third;

the third data is not caused to be sent third, and the third user input is not received third;

the fourth data is caused to be sent fourth, and the fourth user input is received fourth;

the fourth data is not caused to be sent fourth, and the fourth user input is not received fourth;

the fifth data is caused to be sent fifth, and the fifth user input is received fifth;

the fifth data is not caused to be sent fifth, and the fifth user input is not received fifth;

the at least one artificial intelligence algorithm includes at least one artificial intelligence training algorithm;

the at least one artificial intelligence algorithm involves a perceptron algorithm;

the at least one artificial intelligence algorithm involves a support vector machine;

the at least one artificial intelligence algorithm involves a deep learning algorithm;

the amount of training includes a number;

the amount of training involves a quantity of the training;

the amount of training includes a number of iterations;

the amount of training does not include a number of iterations;

the plurality of artificial intelligence algorithm settings are capable of being utilized in controlling the different aspects of the at least one artificial intelligence algorithm to train the computer-implemented artificial intelligence, by altering the different aspects of the at least one artificial intelligence algorithm;

the plurality of artificial intelligence algorithm settings are capable of being utilized in controlling the different aspects of the at least one artificial intelligence algorithm to train the computer-implemented artificial intelligence, by activating the different aspects of the at least one artificial intelligence algorithm;

the plurality of artificial intelligence algorithm settings are capable of being utilized in controlling the different aspects of the at least one artificial intelligence algorithm to train the computer-implemented artificial intelligence, by enabling the different aspects of the at least one artificial intelligence algorithm;

the plurality of artificial intelligence algorithms are capable of being utilized to train the computer-implemented artificial intelligence, by being executed to train the computer-implemented artificial intelligence;

the plurality of artificial intelligence algorithms are capable of being utilized to train the computer-implemented artificial intelligence, by being selected to train the computer-implemented artificial intelligence;

the at least one behavior is utilized by the at least one artificial intelligence algorithm in accordance with the at least one artificial intelligence algorithm setting to train the computer-implemented artificial intelligence utilizing the at least one data type of one or more training input datasets, by the at least one behavior being utilized as an indication of a desired output of the subject system;

the at least one artificial intelligence algorithm of the plurality of artificial intelligence algorithms that is to be utilized to train the computer-implemented artificial intelligence, is initialized, based on the second user input, by initializing the at least one artificial intelligence algorithm which is indicated as being selected by the second user input;

the at least one artificial intelligence algorithm of the plurality of artificial intelligence algorithms that is to be utilized to train the computer-implemented artificial intelligence, is initialized, based on the second user input, by initializing the at least one artificial intelligence algorithm which is indicated as being selected by the second user input, instead of other of the plurality of artificial intelligence algorithms which are not indicated as being selected by the second user input;

the at least one artificial intelligence algorithm of the plurality of artificial intelligence algorithms that is to be utilized to train the computer-implemented artificial intelligence, is initialized, based on the second user input, in addition to the first, third, fourth, and fifth user inputs;

the at least one artificial intelligence algorithm of the plurality of artificial intelligence algorithms that is to be utilized to train the computer-implemented artificial intelligence, is initialized, based on the second user input, in addition to at least one of the first, third, fourth, or fifth user input;

the one or more weights include one or more numerical values;

the one or more weights include one or more numerical values relating at least one of a node or a layer of the at least one artificial intelligence algorithm;

the one or more weights relate to at least one of a node or a layer of the at least one artificial intelligence algorithm;

the one or more weights represent a strength of at least one of a node or a layer of the at least one artificial intelligence algorithm;

the one or more weights represent a connection among at least one of a node or a layer of the at least one artificial intelligence algorithm;

the training state data includes data that describes the training state;

the training state data includes data that indicates the training state;

the training state data includes data that visually indicates the training state;

the training state is of the result of the training;

the training state is of the artificial intelligence;

the training state is a state of a training of the artificial intelligence;

the programming or coding data of the at least one artificial intelligence algorithm, includes programming data of the at least one artificial intelligence algorithm;

the programming or coding data of the at least one artificial intelligence algorithm, includes the coding data of the at least one artificial intelligence algorithm;

the programming or coding data of the at least one artificial intelligence algorithm, includes the programming and coding data of the at least one artificial intelligence algorithm;

the result includes functionality of the artificial intelligence;

the result includes an output of the artificial intelligence;

the result includes the programming or coding data of the at least one artificial intelligence algorithm;

the result includes the programming or coding data of the at least one artificial intelligence algorithm that is capable of causing an output of the at least one artificial intelligence algorithm;

the result includes the programming or coding data of the at least one artificial intelligence algorithm that is capable of causing a functionality of the at least one artificial intelligence algorithm;

the result includes functionality that results from the programming or coding data of the at least one artificial intelligence algorithm;

the result includes output that results from the programming or coding data of the at least one artificial intelligence algorithm;

the result is accessible by being received;

the selection of the subject system is performed by receiving a description of the subject system;

the selection of the subject system is performed by receiving a new description of the subject system from the user device;

the selection of the subject system is performed by receiving a description of the subject system without the subject system being indicated by the system;

the selection of the subject system is performed by receiving a selection of one of a plurality of indicated subject systems;

the selection of the at least one behavior is performed by receiving a description of the at least one behavior;

the selection of the at least one behavior is performed by receiving a new description of the at least one behavior from the user device;

the selection of the at least one behavior is performed by receiving a description of the at least one behavior without the at least one behavior being indicated by the system;

the selection of the at least one behavior is performed by receiving a selection of one of a plurality of indicated behaviors;

the sixth user input to cause retrieval of the information, includes a request that causes initiation of a process that results in the retrieval of the information;

the sixth user input to cause retrieval of the information, includes a request for the retrieval of the information;

the seventh user input to cause the result of the training of the computer-implemented artificial intelligence to be accessible for utilization by the subject system, includes a request that causes the accessibility;

the seventh user input to cause the result of the training of the computer-implemented artificial intelligence to be accessible for utilization by the subject system, includes a request that causes initiation of a process that results in the accessibility;

the at least one artificial intelligence algorithm is at least one of updated or reinforced by iterating through the one or more training input datasets and updating one or more weights of the at least one artificial intelligence algorithm, based on the third user input, by the at least one artificial intelligence algorithm being at least one of updated or reinforced after implementing the at least one artificial intelligence algorithm setting indicated as being selected by the third user input;

the at least one artificial intelligence algorithm is at least one of updated or reinforced by iterating through the one or more training input datasets and updating one or more weights of the at least one artificial intelligence algorithm, based on the third user input, by the at least one artificial intelligence algorithm being at least one of updated or reinforced after implementing the at least one artificial intelligence algorithm setting which is indicated as being selected by the third user input, instead of at least one other artificial intelligence algorithm setting which is not indicated as being selected by the third user input;

the at least one artificial intelligence algorithm is at least one of updated or reinforced by iterating through the one or more training input datasets and updating one or more weights of the at least one artificial intelligence algorithm, based on the third user input, in addition to the first, second, fourth, and fifth user inputs;

the at least one artificial intelligence algorithm is at least one of updated or reinforced by iterating through the one or more training input datasets and updating one or more weights of the at least one artificial intelligence algorithm, based on the third user input, in addition to at least one of the first, second, fourth, or fifth user input; or the selection of the subject system and the selection of at least one behavior.

259. A system, comprising:

means for causing first data to be sent, over at least one network to a user device, to display, at the user device, at least one first user interface element for utilization in receiving first user input including an indication of a selection of at least one aspect of a subject system that is to receive a result of a training of a computer-implemented artificial intelligence;

means for, after the first data is sent, receiving, from the user device over the at least one network, the first user input including the indication of the selection of the at least one aspect of the subject system that is to access the result of the training of the computer-implemented artificial intelligence, based on the utilization of the at least one first user interface element in receiving the first user input including the indication of the selection of the at least one aspect of the subject system that is to access the result of the training of the computer-implemented artificial intelligence;

means for causing second data to be sent, over the at least one network to the user device, to display, at the user device, at least one second user interface element for: indicating a plurality of artificial intelligence algorithms that are capable of being utilized to train the computer-implemented artificial intelligence, and utilization in receiving second user input including an indication of a selection of at least one artificial intelligence algorithm of the plurality of artificial intelligence algorithms that is to be utilized to train the computer-implemented artificial intelligence;

means for, after the second data is sent, receiving, from the user device over the at least one network, the second user input including the indication of the selection of the at least one artificial intelligence algorithm of the plurality of artificial intelligence algorithms that is to be utilized to train the computer-implemented artificial intelligence, based on the utilization of the at least one second user interface element in receiving the second user input including the indication of the selection of the at least one artificial intelligence algorithm of the plurality of artificial intelligence algorithms that is to be utilized to train the computer-implemented artificial intelligence;

means for causing third data to be sent, over the at least one network to the user device, to display, at the user device, at least one third user interface element for: indicating a plurality of artificial intelligence algorithm settings that are capable of being utilized in controlling different aspects of the at least one artificial intelligence algorithm to train the computer-implemented artificial intelligence, and utilization in receiving third user input including an indication of a selection of at least one artificial intelligence algorithm setting of the plurality of artificial intelligence algorithm settings that is to be utilized to control at least one aspect of the different aspects of the at least one artificial intelligence algorithm to train the computer-implemented artificial intelligence, the at least one aspect of the different aspects of the at least one artificial intelligence algorithm including at least one of: a number of layers of the at least one artificial intelligence algorithm, a node of the at least one artificial intelligence algorithm, a function of the at least one artificial intelligence algorithm, or an amount of training of the at least one artificial intelligence algorithm;

means for, after the third data is sent, receiving, from the user device over the at least one network, the third user input including the indication of the selection of the at least one artificial intelligence algorithm setting of the plurality of artificial intelligence algorithm settings that is to be utilized to control the at least one aspect of the different aspects of the at least one artificial intelligence algorithm to train the computer-implemented artificial intelligence, based on the utilization of the at least one third user interface element in receiving the third user input including the indication of the selection of the at least one artificial intelligence algorithm setting of the plurality of artificial intelligence algorithm settings that is to be utilized to control the at least one aspect of the different aspects of the at least one artificial intelligence algorithm to train the computer-implemented artificial intelligence;

means for causing fourth data to be sent, over the at least one network to the user device, to display, at the user device, at least one fourth user interface element for: indicating a plurality of different data types of one or more training input datasets that are capable of being utilized by the at least one artificial intelligence algorithm in accordance with the at least one artificial intelligence algorithm setting to train the computer-implemented artificial intelligence, and utilization in receiving fourth user input including an indication of a selection of at least one data type of the plurality of different data types of one or more training input datasets that is to be utilized by the at least one artificial intelligence algorithm in accordance with the at least one artificial intelligence algorithm setting to train the computer-implemented artificial intelligence, the indicated plurality of different data types of one or more training input datasets including a text data type and an image data type;

means for, after the fourth data is sent, receiving, from the user device over the at least one network, the fourth user input including the indication of the selection of the at least one data type of the plurality of different data types of one or more training input datasets that is to be utilized by the at least one artificial intelligence algorithm in accordance with the at least one artificial intelligence algorithm setting to train the computer-implemented artificial intelligence, based on the utilization of the at least one fourth user interface element in receiving the fourth user input including the indication of the selection of the at least one data type of the plurality of different data types of one or more training input datasets that is to be utilized by the at least one artificial intelligence algorithm in accordance with the at least one artificial intelligence algorithm setting to train the computer-implemented artificial intelligence;

means for causing fifth data to be sent, over the at least one network to the user device, to display, at the user device, at least one fifth user interface element for utilization in receiving fifth user input including indication of a selection of at least one behavior that is to be utilized by the at least one artificial intelligence algorithm in accordance with the at least one artificial intelligence algorithm setting to train the computer-implemented artificial intelligence utilizing the at least one data type of one or more training input datasets;

means for, after the fifth data is sent, receiving, from the user device over the at least one network, the fifth user input including the indication of the selection of the at least one behavior that is to be utilized by the at least one artificial intelligence algorithm in accordance with the at least one artificial intelligence algorithm setting to train the computer-implemented artificial intelligence utilizing the at least one data type of one or more training input datasets, based on the utilization of the at least one fifth user interface element in receiving the fifth user input including the indication of the selection of the at least one behavior that is to be utilized by the at least one artificial intelligence algorithm in accordance with the at least one artificial intelligence algorithm setting to train the computer-implemented artificial intelligence utilizing the at least one data type of one or more training input datasets;

means for receiving, from the user device over the at least one network, sixth user input to cause retrieval of information relating to the at least one artificial intelligence algorithm utilizing the at least one data type of one or more training input datasets and the at least one behavior in accordance with the at least one artificial intelligence algorithm setting to train the computer-implemented artificial intelligence, the information including at least one of: programming or coding data of the at least one artificial intelligence algorithm corresponding to the result of the training of the computer-implemented artificial intelligence, or training state data relating to a training state;

means for receiving, from the user device over the at least one network, seventh user input to cause the result of the training of the computer-implemented artificial intelligence to be accessible for utilization by the subject system;

means for causing storage of sixth data indicating: the at least one aspect of the subject system that is to access the result of the training of the computer-implemented artificial intelligence, the at least one artificial intelligence algorithm of the plurality of artificial intelligence algorithms that is to be utilized to train the computer-implemented artificial intelligence, the at least one artificial intelligence algorithm setting of the plurality of artificial intelligence algorithm settings that is to be utilized to control the at least one aspect of the different aspects of the at least one artificial intelligence algorithm to train the computer-implemented artificial intelligence, the at least one data type of the plurality of different data types of one or more training input datasets that is to be utilized by the at least one artificial intelligence algorithm in accordance with the at least one artificial intelligence algorithm setting to train the computer-implemented artificial intelligence, and the at least one behavior that is to be utilized by the at least one artificial intelligence algorithm in accordance with the at least one artificial intelligence algorithm setting to train the computer-implemented artificial intelligence utilizing the at least one data type of one or more training input datasets;

means for initializing the at least one artificial intelligence algorithm of the plurality of artificial intelligence algorithms that is to be utilized to train the computer-implemented artificial intelligence, based on the second user input; and means for at least one of updating or reinforcing the at least one artificial intelligence algorithm by iterating through the one or more training input datasets and updating one or more weights of the at least one artificial intelligence algorithm, based on the third user input including the indication of the selection of the at least one artificial intelligence algorithm setting of the plurality of artificial intelligence algorithm settings that is to be utilized to control the at least one aspect of the different aspects of the at least one artificial intelligence algorithm to train the computer-implemented artificial intelligence including the at least one of: the number of layers of the at least one artificial intelligence algorithm, the node of the at least one artificial intelligence algorithm, the function of the at least one artificial intelligence algorithm, or the amount of training of the at least one artificial intelligence algorithm, so as to avoid a requirement of user-generated computer-executable computer code being received by the system from the user device to control the at least one aspect of the different aspects of the at least one artificial intelligence algorithm to train the computer-implemented artificial intelligence including the at least one of: the number of layers of the at least one artificial intelligence algorithm, the node of the at least one artificial intelligence algorithm, the function of the at least one artificial intelligence algorithm, or the amount of training of the at least one artificial intelligence algorithm.

* * * * *